United States Patent
Finne et al.

(10) Patent No.: US 9,699,803 B2
(45) Date of Patent: Jul. 4, 2017

(54) METHODS PROVIDING COORDINATION FOR UPLINK (UL) COORDINATED MULTIPOINT (COMP) RECEPTION AND RELATED NETWORK NODES

(71) Applicant: Telefonaktiebolaget L M Ericsson (publ), Stockholm (SE)

(72) Inventors: Magnus Finne, Sundbyberg (SE); Fredrik Huss, Sundbyberg (SE); Robert Karlsson, Sundbyberg (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 184 days.

(21) Appl. No.: 14/559,357

(22) Filed: Dec. 3, 2014

(65) Prior Publication Data

US 2016/0165626 A1    Jun. 9, 2016

(51) Int. Cl.
| | | |
|---|---|---|
| *H04W 72/12* | (2009.01) | |
| *H04W 72/14* | (2009.01) | |
| *H04B 7/02* | (2017.01) | |
| *H04B 7/024* | (2017.01) | |

(52) U.S. Cl.
CPC ... *H04W 72/1268* (2013.01); *H04W 72/1278* (2013.01); *H04W 72/14* (2013.01); *H04B 7/024* (2013.01)

(58) Field of Classification Search
CPC ......... H04W 72/1268; H04W 72/1278; H04W 72/14; H04B 7/024
See application file for complete search history.

(56) References Cited

U.S. PATENT DOCUMENTS

| | | | | |
|---|---|---|---|---|
| 2012/0201202 A1* | 8/2012 | Hong | ............... | H04L 1/1854 370/328 |
| 2014/0269642 A1* | 9/2014 | Forenza | ................. | H04J 11/003 370/337 |
| 2015/0131568 A1* | 5/2015 | You | ....................... | H04L 5/001 370/329 |

FOREIGN PATENT DOCUMENTS

| | | |
|---|---|---|
| WO | WO 2010/105702 A1 | 9/2010 |
| WO | WO 2013/029660 A1 | 3/2013 |
| WO | WO 2014/062104 | 4/2014 |

OTHER PUBLICATIONS

International Search Report and Written Opinion Corresponding to International Application No. PCT/SE2014/051532; Date of Mailing: Jul. 29, 2015; 10 Pages.

(Continued)

*Primary Examiner* — Walter Divito
(74) *Attorney, Agent, or Firm* — Sage Patent Group

(57) ABSTRACT

Scheduling information for a wireless device may be transmitted from a first node of a network to the second node of the network wherein the scheduling information defines a plurality of time slots for UpLink transmission from the wireless device. After transmitting the scheduling information to the second node, a UL signaling grant may be transmitted to the wireless device for one of the time slots defined by the scheduling information. A UL transmission may be received from the wireless device at the first node over the time slot of the UL signaling grant. Information may be received from the second node relating to the UL transmission over the time slot of the UL signaling grant. The UL transmission may be processed at the first node using the information from the second node relating to the UL transmission from the wireless device.

27 Claims, 9 Drawing Sheets

(56) References Cited

OTHER PUBLICATIONS

Huawei "Inter-eNB and Intra-eNB Schemes for CoMP in LTE-Advance", R1-083050, 3GPP TSG RAN WG1#54, Jeju, Korea, Aug. 18-22, 2008, 2 Pages.

ZTE "A Few Considerations on Inter-eNB CoMP", R2-094721, 3GPP TSG RAN WG2#67, Shenzhen, China, Aug. 24-28, 2009, 2 Pages.

* cited by examiner

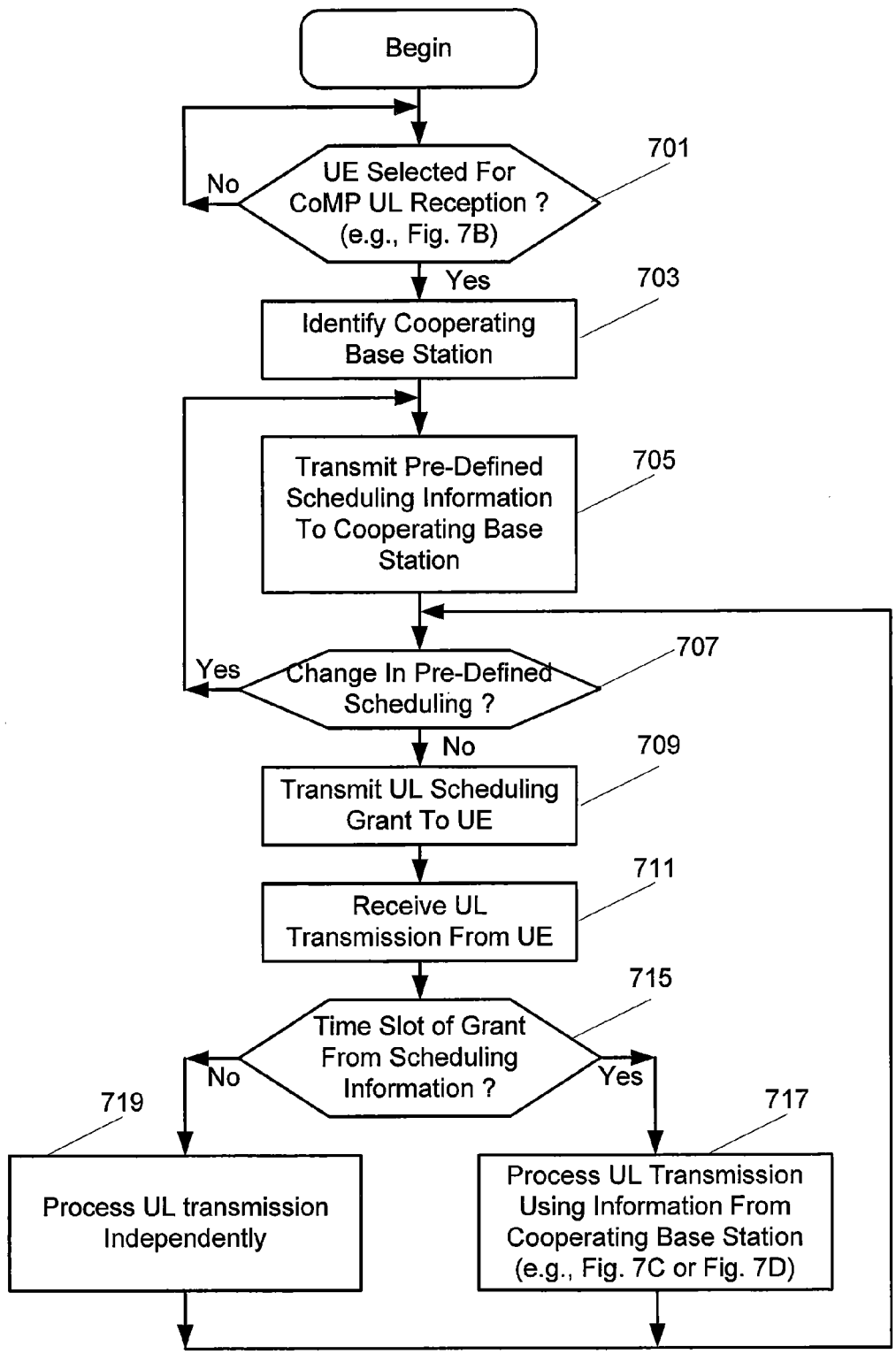

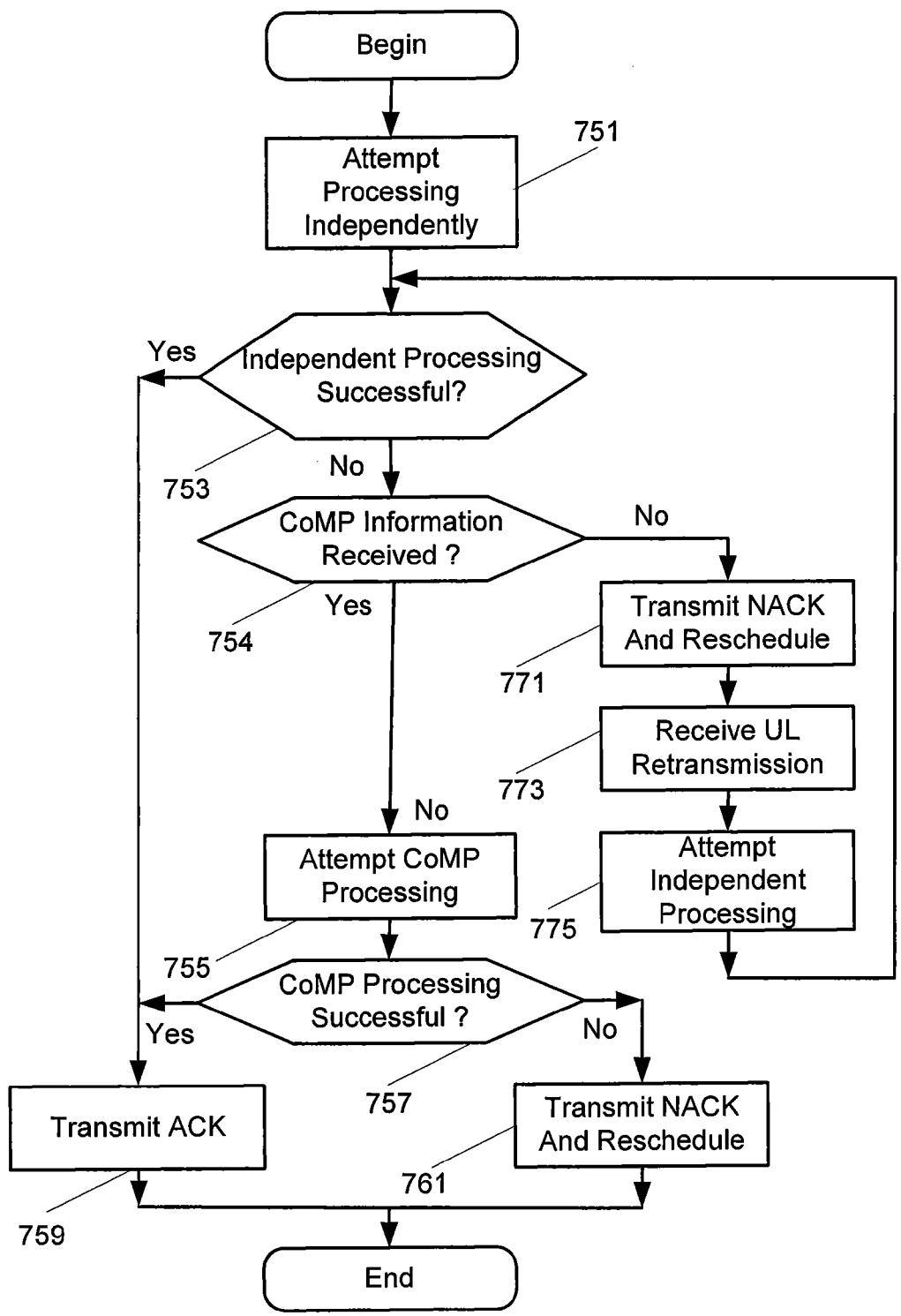

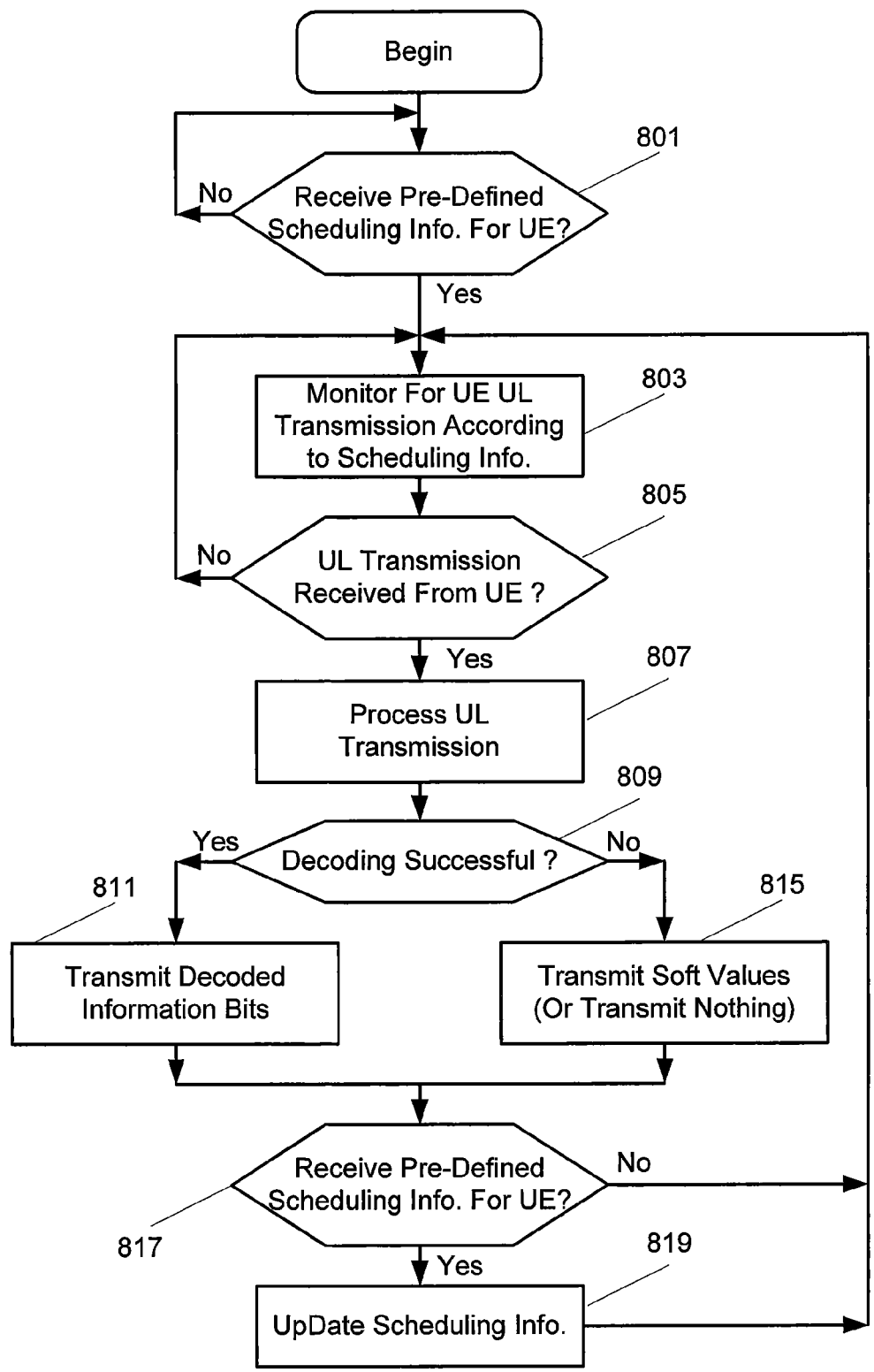

METHODS PROVIDING COORDINATION FOR UPLINK (UL) COORDINATED MULTIPOINT (COMP) RECEPTION AND RELATED NETWORK NODES

BACKGROUND

The present disclosure relates generally to wireless communications, and more particularly, to coordinated multipoint (CoMP) uplink (UL) reception and related network nodes.

Coordinated Multipoint (CoMP) transmission/reception is an advanced technology for cellular communication networks to improve coverage, support high data rates, improve cell-edge throughput and/or to increase system throughput.

Uplink CoMP generally implies coordination/cooperation among multiple geographically separated reception points, and downlink CoMP generally implies dynamic coordination/cooperation among multiple geographically separated transmission points. In general, the basic idea of CoMP is to perform joint detection in the uplink by jointly processing radio signals received at multiple points, and likewise to perform joint transmission in the downlink by coordinating transmission from multiple points to one or more user terminals.

As an intermediate step towards general CoMP operation, so-called intra-site coordination/cooperation has been proposed, where different sectors of the same radio base station are coordinated.

It is also possible to coordinate different sectors belonging to different sites, so-called inter-site coordination/cooperation, where the data has to be exchanged between the involved radio base stations, or more generally access points, via the so-called backhaul network.

For the uplink, the entity responsible for decoding, typically one of the access points such as a serving radio base station, may thus collect samples from other access points via the backhaul network, and include them in the decoding of the user. CoMP is discussed, for example, in International Publication No. WO 2014/062104 entitled "Selection of Access Points For Coordinated Multipoint Uplink Reception," the disclosure of which is hereby incorporated herein in its entirety by reference.

The area of coordination/cooperation between base stations (e.g., eNBs) is of high interest to increase capacity and coverage, especially in Hetnet (heterogeneous network) scenarios. Most solutions and features so far are intra-eNB, as they are easier to deploy with, for example, common baseband processing and/or good interconnect between processing boards. Coordination/cooperation between different base stations, however, may be needed to work with current transport network deployments.

One coordination feature that is useful in the above scenario to improve uplink reception by coordinated multipoint (CoMP) reception. The idea is to receive the signal from one wireless device UE at several reception points, and to utilize the received signals from all of these points to improve reception. One approach, for example, uses maximal ratio combining (MRC) and/or interference rejection combining (IRC) on the received signals from the different reception points. Another approach is to demodulate and decode the signal at each of the reception points, and then it may be sufficient that the received signal quality is good enough at one of the reception points to recover the information sent by wireless device UE. This is known as soft handover in WCDMA networks. Also, intermediate data, for example, soft values and/or coded bits may be exchanged between the reception points.

Existing approaches for CoMP may rely, to a great extent, on availability of a low-latency, high-throughput link between cooperating cells or base stations. For example, in the intra-eNB case, IQ samples received for several cells of the same base station can be processed jointly using common baseband processing. Then, if a wireless device UE is located on the cell edge, IQ samples from the neighbor cell can be used to improve reception performance.

In the inter-eNB case, a similar approach can be used between cells in different base station, for example, by providing centralized baseband processing for all base stations or for a group of adjacent base stations. Centralized baseband processing may require fast links (e.g., Common Public Radio Interface or CPRI) typically on dedicated fiber connections between each base station and the centralized baseband processor.

Another approach for inter base station CoMP (e.g., inter-eNB CoMP) would be to keep the baseband processing in each base station while providing high bandwidth and low latency transport network between base stations. This would allow sending, for example, IQ samples received for a cell in a cooperating base station over the transport network to a serving base station. The serving base station could then use UpLink (UL) CoMP for multiple cells including the cell in the first base station similar to the centralized baseband processing solution. Stated in other words, the serving base station could perform joint baseband processing using IQ data (also referred to as IQ samples) from the serving base station and from an adjacent base station(s) to provide UL CoMP.

For CoMP to be fully flexible (that is, to not put significant constraints on scheduling) in LTE, scheduling decisions may need to be distributed from the serving base station to the cooperating base station, and arrive before wireless device UE start the scheduled UL transmission. To get the most from CoMP, the information from the reception in the cooperating base station may need to arrive at the serving base station before it schedules the next transmission, and sufficient processing time may be required at both cooperating and serving base stations.

In traditional network deployments, the transport network may have constraints on bandwidth and/or it may have high latency. The constraints on bandwidth may limit a type of CoMP that can be employed, because high latencies may constrain scheduling and/or reduce achievable gains due to information arriving late. Accordingly, decentralized CoMP may be difficult use with conventional transport networks. A significant restriction may be that synchronous HARQ is used in the uplink which means that retransmissions may be required to occur on predefined occasions. This may set a limit on available processing time at the base station. Accordingly, a high-latency low-bandwidth X2 link may reduce performance of conventional UL CoMP.

SUMMARY

According to some embodiments of inventive concepts, a first node may provide communication with a wireless device in a communications network including the first node and a second node. The first node may transmit scheduling information for the wireless device from the first node to the second node wherein the scheduling information defines a plurality of time slots for UpLink (UL) transmission from the wireless device to the communications network. After transmitting the scheduling information to the second node, the first node may transmit a UL signaling grant to the wireless device for one of the plurality of time slots defined by the scheduling information. The first node may then receive a UL transmission from the wireless device at the first node over the time slot of the UL signaling grant, and the first node may receive information from the second node relating to the UL transmission from the wireless device over the time slot of the UL signaling grant. The first node may process the UL transmission from the wireless device using the information from the second node relating to the UL transmission from the wireless device.

By providing scheduling information to the second node (e.g., a cooperating base station) defining a plurality of time slots for UL transmission from the wireless device for which CoMP reception is to be performed, signaling overhead between network nodes may be reduced.

Transmitting the scheduling information may include transmitting the scheduling information responsive to determining that the wireless device is at a cell edge adjacent to the second node and responsive to the wireless device being subject to Transmission Time Interval bundling.

Transmitting the scheduling information may include transmitting the scheduling information responsive to determining that UL transmissions from the wireless device are interference limited.

The UL signaling grant may be a first UL signaling grant, the time slot of the first UL signaling grant may be a first time slot of the plurality of time slots, the UL transmission may be a first UL transmission, the scheduling information may include a first hypothesis for a first data rate and a second hypothesis for a second data rate different than the first data rate, the first UL signaling grant may be a grant for the first data rate of the first hypothesis, and receiving the first UL transmission may include receiving the first UL transmission at the first data rate of the first hypothesis. After transmitting the scheduling information to the second node, a second UL signaling grant may be transmitted to the wireless device for a second one of the plurality of time slots defined by the scheduling information, and the second UL signaling grant may be for the second data rate of the second hypothesis. A second UL transmission may be received from the wireless device at the first node over the second time slot of the second UL signaling grant at the second data rate of the second hypothesis. Information may be received from the second node relating to the second UL transmission from the wireless device over the second time slot of the UL signaling grant. The second UL transmission from the wireless device may be processed at the first node using the information from the second node relating to the second UL transmission from the wireless device.

The first hypothesis may be associated with a first bit combination (e.g., a first cyclic shift and Orthogonal Cover Code OCC bit combination), the second hypothesis may be associated with a second bit combination (e.g., a second cyclic shift and Orthogonal Cover Code OCC bit combination), wherein the first UL signaling grant includes the first bit combination and the second UL signaling grant includes the second bit combination.

The UL signaling grant may be a first UL signaling grant, the time slot of the UL signaling grant may be a first time slot of the plurality of time slots, and the UL transmission may be a first UL transmission. After transmitting the scheduling information to the second node, a second UL signaling grant may be transmitted to the wireless device for a second time slot, and the second time slot may not be included in the plurality of time slots of the scheduling information. A second UL transmission may be received from the wireless device at the first node over the second time slot of the second signaling grant, and the second UL transmission may be independently processed without using information from the second node.

Processing may include jointly processing the uplink transmission using the information from the second node. The UL transmission from the wireless device may be independently processed without using the information from the second node, and jointly processing the UL transmission from the wireless device using the information from the second node may include jointly processing responsive to failure decoding the UL transmission when independently processing the UL transmission.

The information from the second node may include at least one of decoded information bits and/or soft information values for the UL transmission from the wireless device. The soft information values may include at least one of IQ data used for baseband processing, soft information bits used for decoding, and/or coded information bits used for decoding. Soft information bits may be analog values (e.g., log-likelihood ratios) that give a probability for a coded bit being 0 or 1, and coded information bits may be binary values based on hard decisions.

Processing the uplink transmission may include jointly demodulating and/or jointly decoding the uplink transmission from the wireless device using the information from the second node.

The scheduling information may define a plurality of periodic time slots for UL transmission from the wireless device.

The scheduling information may include at least one of a physical cell identity PCI for the first node, a Cell Radio Network Temporary Identifier C-RNTI for the wireless device, a modulation and coding scheme MCS, a Physical Resource Block PRB allocation, a System Frame Number SFN, a subframe number, a cyclic shift, a periodic Channel Quality Indication CQI configuration, and/or a periodicity of the plurality of time slots of the scheduling information.

The communication network may be a Radio Access Network RAN, the first node may be a serving base station for the wireless device, the second node may be a cooperating base station for the wireless device, and processing the UL transmission may include processing the UL transmission from the wireless device using Coordinated Multipoint CoMP reception.

The communication network may include a third node, and the scheduling information for the wireless device may be transmitted from the first node to the third node. Information may be transmitted from the third node relating to the UL transmission from the wireless device over the time slot of the UL signaling grant, and the UL transmission from the wireless device may be processed at the first node using the information from the second and third nodes relating to the UL transmission from the wireless device.

According to some other embodiments of inventive concepts, a first node may be provided in a communications network including the first node and a second node providing communication with a wireless device. Scheduling information for the wireless device may be received at the first node from the second node wherein the scheduling information defines a plurality of time slots for UpLink transmission from the wireless device to the communications network. After receiving the scheduling information from the second node, a UL transmission may be received from the wireless device at the first node over one of the plurality of time slots defined by the scheduling information, and the UL transmission from the wireless device may be processed at the first node. Information may be transmitted from the first node to the second node wherein the information relates to the UL transmission from the wireless device over the time slot of the UL signaling grant.

The UL transmission from the wireless device may be a first UL transmission from the wireless device, the time slot of the first UL transmission from the wireless device may be a first time slot of the plurality of time slots of the scheduling information, the scheduling information may include a first hypothesis for a first data rate and a second hypothesis for a second data rate different than the first data rate, and receiving the first UL transmission may include receiving the first UL transmission at the first data rate of the first hypothesis.

After receiving the scheduling information at the first node from the second node, a second UL transmission may be received from the wireless device at the first node over a second one of the plurality of time slots defined by the scheduling information, and the second UL transmission may be received at the second data rate of the second hypothesis. The second UL transmission from the wireless device may be processed at the first node, and information may be transmitted from the first node to the second node wherein the information relates to the second UL transmission from the wireless device over the second time slot.

The scheduling information may associate the first hypothesis with a first bit combination and the second hypothesis with a second bit combination, the first UL transmission from the wireless device may include the first bit combination, and the second UL transmission from the wireless device may include the second bit combination. Processing the first UL transmission may include processing the first UL transmission according to the first hypothesis for the first data rate responsive to receiving the first bit combination with the first UL transmission, and processing the second UL transmission may include processing the second UL transmission according to the second hypothesis for the second data rate responsive to receiving the bit combination with the second UL transmission. The first bit combination may be a first cyclic shift and Orthogonal Cover Code. OCC bit combination, and the second bit combination may be a second cyclic shift and OCC bit combination.

The information relating to the UL transmission may include at least one of decoded information bits and/or soft information values for the UL transmission from the wireless device. The soft information values may include at least one of IQ data used for baseband processing, soft information bits used for decoding, and/or coded information bits used for decoding.

The scheduling information may define a plurality of periodic time slots for UL transmission from the wireless device. The scheduling information may include at least one of a physical cell identity PCI for the second node, a Cell Radio Network Temporary Identifier C-RNTI for the wireless device, a modulation and coding scheme MCS, a Physical Resource Block PRB allocation, a System Frame Number SFN, a subframe number, a cyclic shift, a periodic Channel Quality Indication CQI configuration, and/or a periodicity of the plurality of time slots of the scheduling information.

The communication network may be a Radio Access Network RAN wherein the first node is a cooperating base station for the wireless device, wherein the second node is a serving base station for the wireless device, and wherein processing the UL transmission includes processing the UL transmission from the wireless device using Coordinated Multipoint CoMP reception.

Processing the UL transmission may include successfully decoding the UL transmission to generate decoded information bits for the UL transmission, and transmitting information may include transmitting the decoded information bits responsive to successfully decoding the UL transmission.

Processing the UL transmission may include failure decoding the UL transmission, and transmitting information relating to the UL transmission may include transmitting IQ data used for baseband processing, soft information bits used for decoding, and/or coded information bits used for decoding, responsive to failure decoding.

The UL transmission from the wireless device may be a first UL transmission from the wireless device, the time slot of the first UL transmission from the wireless device may be a first time slot of the plurality of time slots of the scheduling information, processing the first UL transmission may include attempting to decode the first UL transmission, and transmitting the information may include transmitting the information relating to the first UL transmission responsive to successfully decoding the first UL transmission. After receiving the scheduling information at the first node from the second node, a second UL transmission may be received from the wireless device at the first node over a second one of the plurality of time slots defined by the scheduling information. The second UL transmission from the wireless device may be processed at the first node, and processing may include attempting to decode the second UL transmission. Responsive to failure decoding the second UL transmission, transmission of information relating to the second UL transmission may be blocked.

According to some other embodiments of inventive concepts, a first node may provide communication with a wireless device in a communications network including the first node and a second node. The first node may include a network interface configured to provide communications with other nodes of the communications network, a transceiver configured to provide wireless communications with wireless devices in a cell of the first node, and a processor coupled with the network interface and the transceiver. The processor may be configured to transmit scheduling information for the wireless device through the network interface to a second node wherein the scheduling information defines a plurality of time slots for UpLink transmission from the wireless device to the communications network. The processor may be configured to transmit a UL signaling grant through the transceiver to the wireless device for one of the plurality of time slots defined by the scheduling information after transmitting the scheduling information to the second node. The processor may be configured to receive a UL transmission from the wireless device through the transceiver over the time slot of the UL signaling grant. The processor may be configured to receive information from the second node through the network interface wherein the information relates to the UL transmission from the wireless device over the time slot of the UL signaling grant. The processor may be configured to process the UL transmission from the wireless device using the information from the second node relating to the UL transmission from the wireless device.

According to still other embodiments of inventive concepts, a first node in a communications network may include the first node and a second node providing communication with a wireless device. The first node may include a network interface configured to provide communications with the second node of the communications network, a transceiver configured to provide wireless communications with wireless devices in a cell of the first node, and a processor coupled with the network interface and the transceiver. The processor may be configured to receive scheduling information for the wireless device through the network interface from the second node wherein the scheduling information defines a plurality of time slots for UpLink UL transmission from the wireless device to the communications network. The processor may be configured to receive a UL transmission from the wireless device through the transceiver over one of the plurality of time slots defined by the scheduling information after receiving the scheduling information from the second node. The processor may be configured to process the UL transmission from the wireless device, and configured to transmit information relating to the UL transmission from the wireless device over the time slot of the UL signaling grant, wherein the information is transmitted through the transceiver to the second node.

BRIEF DESCRIPTION OF THE DRAWINGS

The accompanying drawings, which are included to provide a further understanding of the disclosure and are incorporated herein and constitute a part of this application, illustrate certain non-limiting embodiments of inventive concepts. In the drawings:

FIGS. 7A, 7B, 7C, and 7D are flow diagrams illustrating operations of a serving base station according to some embodiments of inventive concepts; and FIG. 8 is a flow diagram illustrating operations of a cooperating base station according to some embodiments of inventive concepts.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of inventive concepts to those skilled in the art. It should also be noted that these embodiments are not mutually exclusive. Components from one embodiment may be tacitly assumed to be present/used in another embodiment.

For purposes of illustration and explanation only, these and other embodiments of inventive concepts are described herein in the context of operating in a RAN (Radio Access Network) that communicates over radio communication channels with wireless devices. It will be understood, however, that inventive concepts are not limited to such embodiments and may be embodied generally in any type of communication network. As used herein, a wireless device (also referred to as a UE, user equipment node, mobile device, mobile terminal, wireless terminal, etc.) can include any device that receives data from and/or transmits data to a communication network, and may include, but is not limited to, a mobile telephone ("cellular" telephone), laptop/portable computer, pocket computer, hand-held computer, an M2M (machine-to-machine) device, IoT (Internet of Things) device, and/or desktop computer.

Note that although terminology from 3GPP (3rd Generation Partnership Project) LTE (Long Term Evolution) has been used in this disclosure to provide examples of embodiments of inventive concepts, this should not be seen as limiting the scope of inventive concepts to only the aforementioned system. Other wireless systems, including WCDMA, WiMax, UMB, and/or GSM, may also benefit from exploiting ideas/concepts covered within this disclosure.

Also, note that terminology such as base station (also referred to as an eNodeB, eNB, etc.) and wireless device (also referred to as a UE, user equipment node, mobile device, mobile terminal, wireless terminal, etc.) should be considering non-limiting.

Figure 1A:
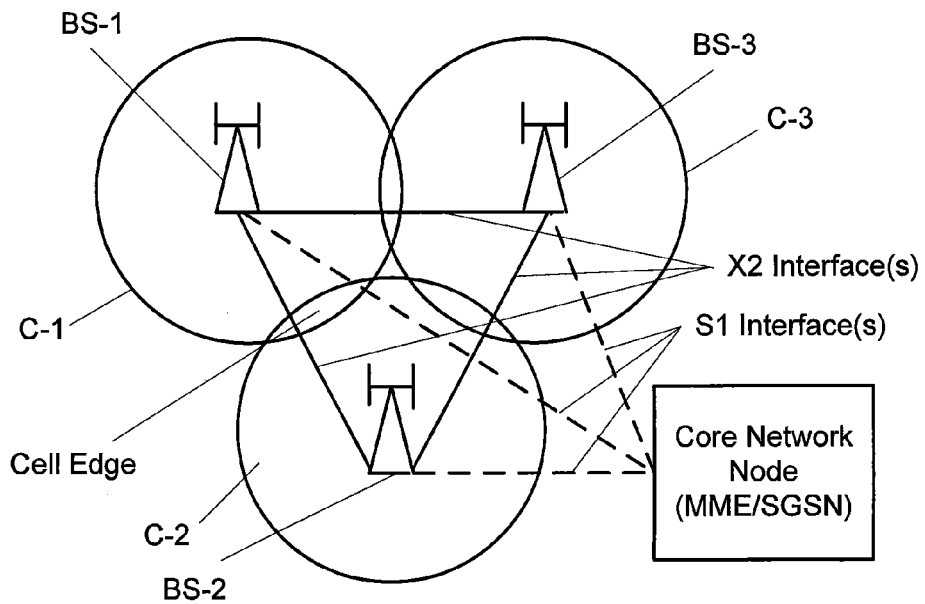
FIGS. 1A and 1B are a schematic and block diagrams illustrating network architectures according to some embodiments of inventive concepts.

FIG. 1A is a schematic diagram illustrating an LTE architecture of base stations (e.g., eNBs) BS-1, BS-2, and BS-2 of a Radio Access Network RAN (E-UTRAN) and a core network node MME/S-GW according to some embodiments of inventive concepts. As shown, each base station may provide service over a respective cell C-1, C-2, and C-3, and communications between base stations may be provided over a respective interface(s), such as an X2 interface(s), illustrated with solid lines. Moreover, communications between the core network node and respective base stations may be provided over a respective interface, such as an S1 interface(s), illustrated with dashed lines. In addition, a cell edge is identified for base station BS-1 adjacent to cell C-2 of base station BS-2. As discussed in greater detail below, base station BS-1 may use CoMP according to some embodiments of inventive concepts to receive uplink transmission from a wireless device that is connected with base station BS-1 (i.e., base station BS-1 is the serving base station for the wireless device) and that is located at the cell edge of base station BS-1 adjacent to base station BS-2 (i.e., base station BS-2 is the cooperating base station).

Figure 1B:
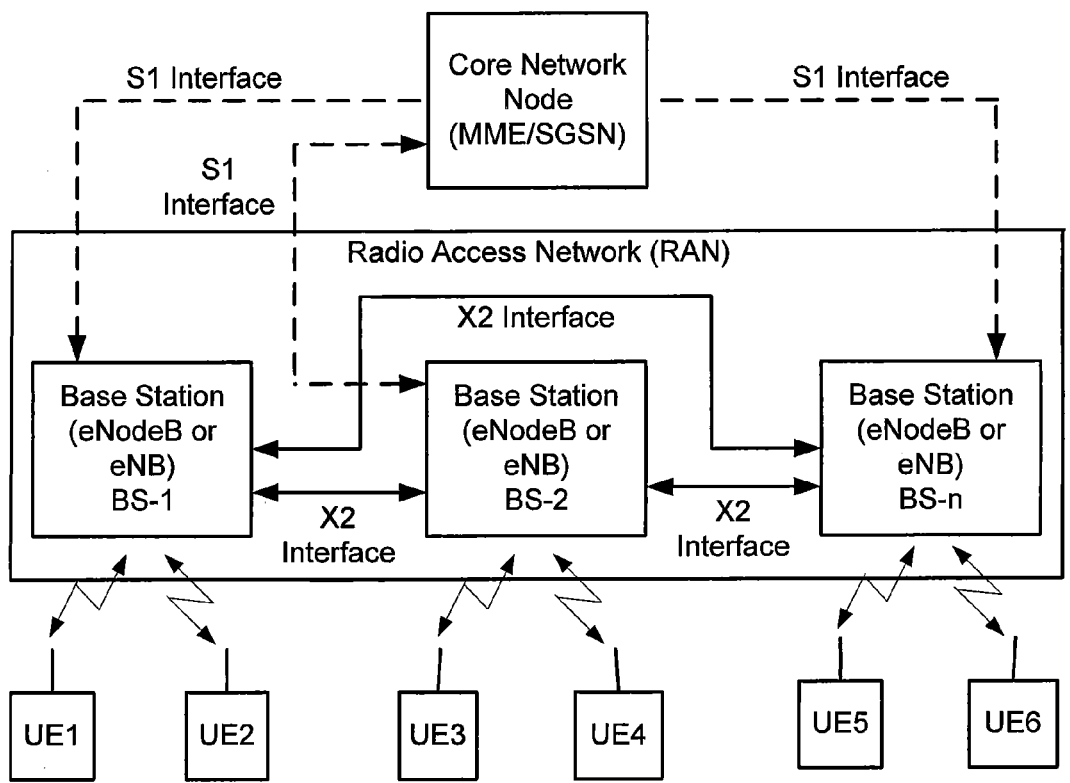

FIG. 1B is a block diagram further illustrating the LTE architecture of FIG. 1A according to some embodiments of present inventive concepts. As shown, communications between base stations and one or more core network nodes (e.g., Mobility Management Entity MME or Service GPRS Support Node SGSN) may be provided using respective S1 interfaces, and communications between base stations may be provided using respective X2 interfaces. Each base station BS may communicate over a radio interface (including uplinks and downlinks) with respective wireless devices UEs in a respective cell or cells supported by the base station (shown in FIG. 1A). By way of example, base station BS-1 is shown in communication with wireless devices UE-1 and UE-2, base station BS-2 is shown in communication with wireless devices UE-3 and UE-4, and base station BS-3 is shown in communication with wireless devices UE-5 and UE-6. In examples discussed below, wireless device UE-1 is located at the cell edge of base station BS-1 adjacent to base station BS-2 so that base station BS-1 is the serving base station for wireless device UE-1 and base station BS-2 is the cooperating base station for wireless device UE-1.

Figure 2:
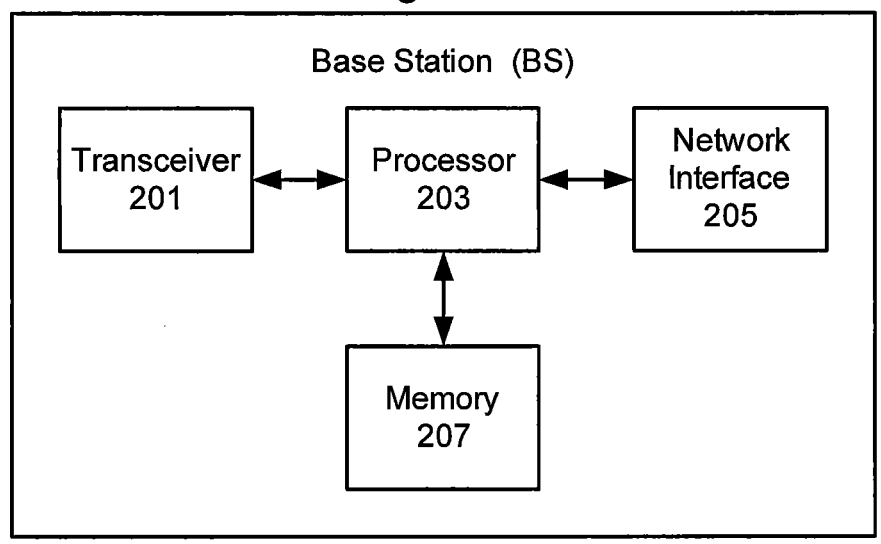
FIG. 2 is a block diagram illustrating a base station according to some embodiments of FIGS. 1A and 1B.

FIG. 2 is a block diagram illustrating elements of a base station BS of FIGS. 1A and 1B. As shown, a base station BS may include a transceiver circuit 201 (also referred to as a transceiver or radio interface) configured to provide radio communications with a plurality of wireless devices, a network interface circuit 205 (also referred to as a network interface) configured to provide communications with other base stations of the RAN (e.g., over the X2 interface), and a processor circuit 203 (also referred to as a processor) coupled to the transceiver circuit and the network interface circuit, and a memory circuit 207 coupled to the processor circuit. The memory circuit 207 may include computer readable program code that when executed by the processor circuit 203 causes the processor circuit to perform operations according to embodiments disclosed herein. According to other embodiments, processor circuit 203 may be defined to include memory so that a memory circuit is not separately provided. Each of base stations BS-1, BS-2, and BS-3 may be separately implemented according to the structure of FIG. 2. Moreover, processor circuit may be configured to perform UL reception processing (e.g., including baseband processing, demodulation, and/or decoding) and/or UL CoMP reception processing (e.g., including joint baseband processing using IQ data from both serving and cooperating base stations, joint demodulation/decoding using soft information bits from both serving and cooperating base stations, and/or joint decoding using coded information bits from both serving and cooperating base stations).

Figure 3:
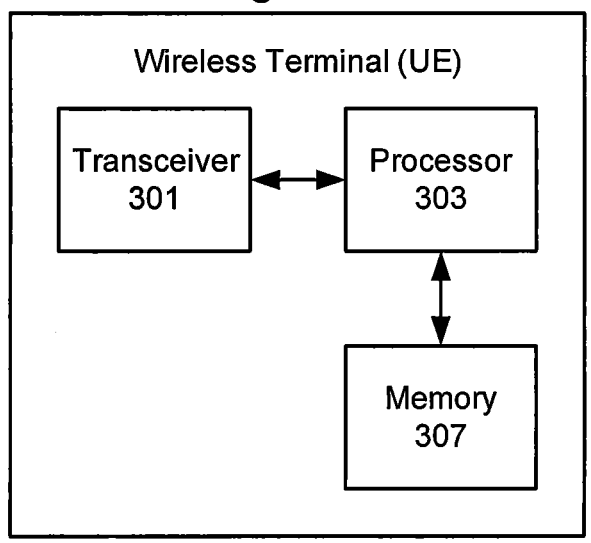
FIG. 3 is a block diagram illustrating a wireless device according to some embodiments of FIGS. 1A and 1B.

FIG. 3 is a block diagram illustrating elements of a wireless device UE of Figures A and 1B. As shown, a wireless device UE may include a transceiver circuit 301 (also referred to as a transceiver) including a transmitter and a receiver configured to provide radio communications with a base station BS, a processor circuit 303 (also referred to as a processor) coupled to the transceiver circuit, and a memory circuit 307 coupled to the processor circuit. The memory circuit 307 may include computer readable program code that when executed by the processor circuit 303 causes the processor circuit to perform operations according to embodiments disclosed herein. According to other embodiments, processor circuit 303 may be defined to include memory so that a memory circuit is not separately provided.

Figure 4:
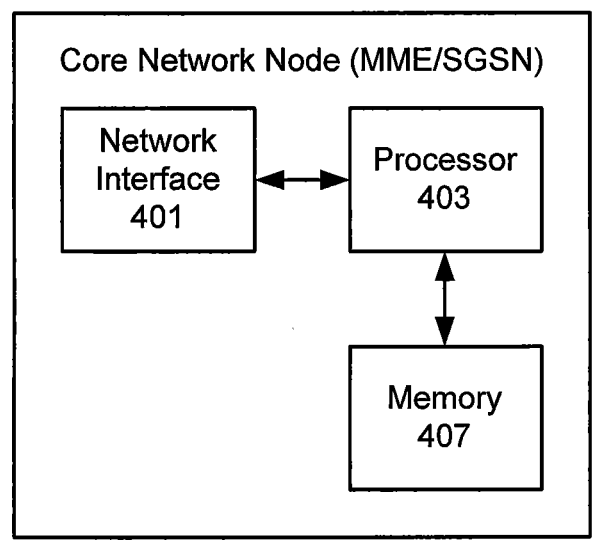
FIG. 4 is a block diagram illustrating a core network node according to some embodiments of FIGS. 1A and 1B.

FIG. 4 is a block diagram illustrating elements of a core network node (e.g., an MME and/or an SGSN) of FIG. 1. As shown, a core network node may include a network interface circuit 401 (also referred to as a network interface) configured to provide communications with base stations of the RAN (e.g., over the S1 interface), a processor circuit 403 (also referred to as a processor) coupled to the network interface circuit, and a memory circuit 407 coupled to the processor circuit. The memory circuit 407 may include computer readable program code that when executed by the processor circuit 403 causes the processor circuit to perform operations according to embodiments disclosed herein. According to other embodiments, processor circuit 403 may be defined to include memory so that a memory circuit is not separately provided.

According to some embodiments of inventive concepts, pre-defined scheduling information may be sent from serving base station BS-1 to cooperating base station BS-2 (or cooperating base stations BS-2 and BS-3, also referred to as coordinating base stations). The pre-defined scheduling information may provide the possible transmissions that serving base station BS-1 schedules for wireless device UE-1 when CoMP reception is to be used. For example, serving base station BS-1 can schedule one Voice over Internet Protocol VoIP packet every 20 ms, and possibly HARQ retransmissions as well. Since the pre-defined scheduling information is not latency critical, the pre-defined scheduling information may be transmitted on a relatively high latency transport network between the serving and cooperating base stations without significantly reducing CoMP reception performance. Serving base station BS-1 is not forced to schedule at the predefined occasions if UL CoMP reception gain is not needed/used. If CoMP reception gain is desired/needed for a given UL transmission from wireless device UE-1, serving base station BS-1 can schedule one or more UL transmissions from wireless device UE-1 according to the predefined scheduling information to provide UL CoMP reception gain.

Using the pre-defined scheduling information, cooperating base station BS-2 (also referred to as a coordinating base station) can then receive wireless device UE-1 UL transmission and/or information relating thereto, and send data relating to wireless device UE-1 UL transmission to serving base station BS-1. Serving base station BS-1 may combine of data relating to wireless device UE-1 UL transmission from cooperating base station BS-2 with data relating to wireless device UE-1 UL transmission from serving base station BS-1 to provide UL CoMP reception gain. The data from serving base station BS-1 may include IQ data (also referred to as IQ samples), soft information bits (used for decoding), coded bits (used for decoding), or fully decoded bits (output of decoding), for example, depending on the available bandwidth.

In real transport networks providing communications between base stations, relatively high-latency and/or relatively low-throughput may be common characteristics. According to some embodiments of inventive concepts, UL CoMP reception gain may be achieved using high-latency and low-throughput links between base stations.

In a group of base stations, where one base station acts as serving base station BS-1 with respect to a wireless device UE-1 (i.e., the base station that provides the UE with control signaling) and one or more base stations BS-2 and/or BS-3 act as cooperating base stations (also referred to as coordinating base stations) for the wireless device UE-1.

Figure 5:
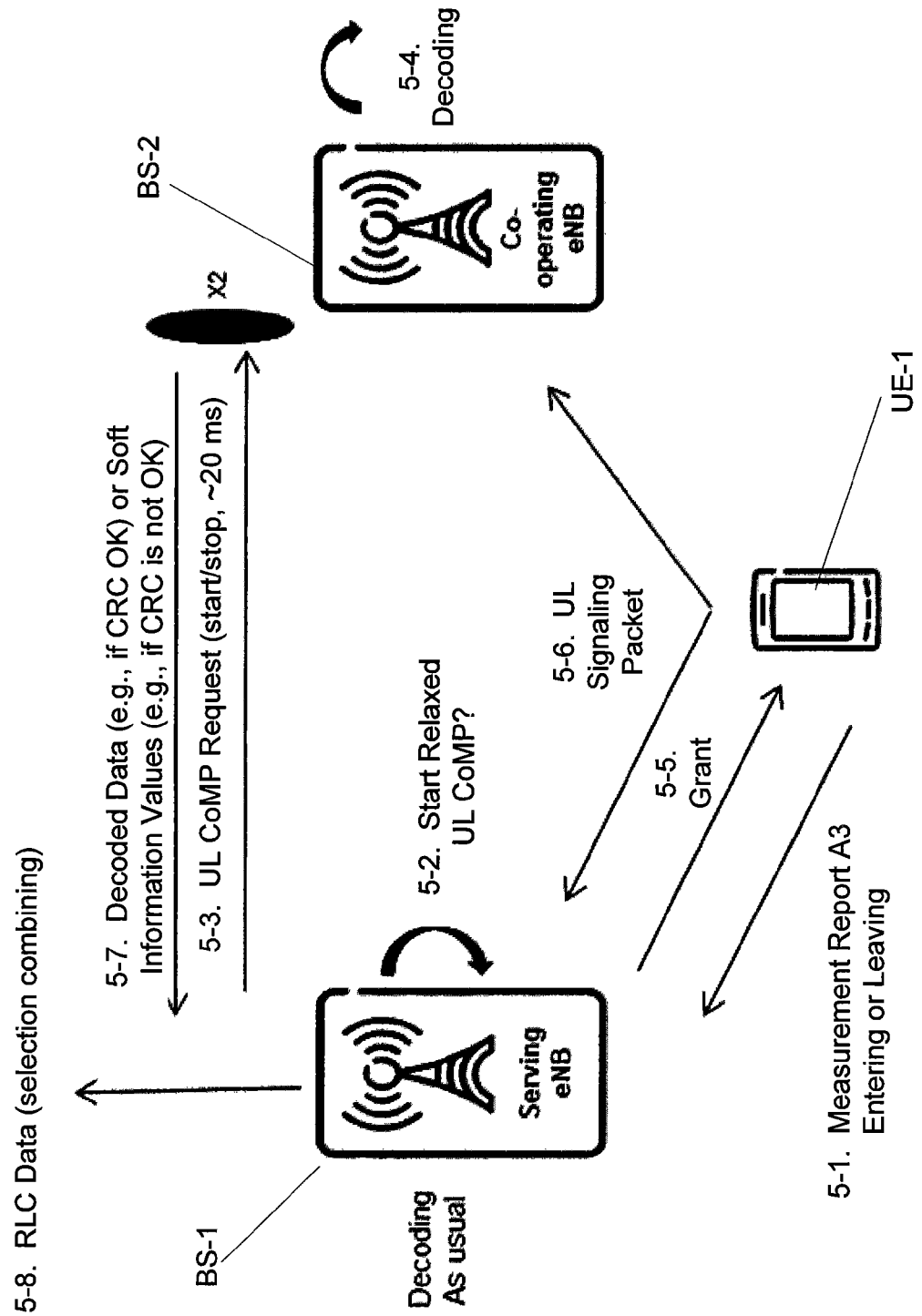
FIG. 5 is a schematic diagram illustrating operations of coordinating base stations providing UpLink CoMP reception according to some embodiments of inventive concepts.

Embodiments of inventive concepts are described in the following operations, which are also illustrated in FIG. 5:

Operation 5-1. When wireless device UE-1 is connected (e.g., in an RRC connected state) with serving base station BS-1, measurements (e.g., from wireless device UE-1) are used by serving base station BS-1 to determine if wireless device UE-1 is close to a cell edge with another base station. For example, an A3 event may be configured based on measured Reference Signal Received Power RSRP in the downlink DL, and based on the A3 event, wireless device UE-1 may send a measurement report when wireless device UE-1 is at the cell edge of serving base station BS-1 close to another base station. Stated in other words, wireless device UE-1 may measure DL link signals from the serving and neighbor base stations, and if a strength/quality of a neighbor base station exceeds a threshold and/or an offset relative to serving base station BS-1, wireless device UE-1 may transmit a measurement report to serving base station BS-1 indicating DL signal strengths of the serving and neighboring base stations.

Operation 5-2. Based on the measurements received from wireless device UE-1, serving base station BS-1 may decide if CoMP reception should be used to receive UL transmissions from wireless device UE-1 using the neighboring base station as a cooperating base station. The decision may be based, for example, on reported measurements received from wireless device UE-1, such as, pathloss or SINR (Signal to Interference plus Noise Ratio), and/or power headroom. It may be advantageous to identify wireless devices UEs near the cell edge for which UL reception may be difficult due to limited output power in wireless device UE-1 and/or changing environment. The decision may also be coupled or related to other uplink-enhancing features such as activating TTI (Transmission Time Interval) bundling to increase the transmit duration for each transport block.

Operation 5-3. When uplink CoMP reception between the serving and cooperating base stations BS-1 and BS-2 is selected, a UL CoMP reception request message is sent from serving base station BS-1 (over the X2 interface and/or the S1 interface) with pre-defined scheduling information to inform cooperating base station BS-2 of the expected uplink transmissions from wireless device UE-1. This information may include, for example, PCI (Physical Cell Identity) for the serving cell, C-RNTI (Cell Radio Network Temporary Identifier), MCS (Modulating and Coding Scheme), PRB (Physical Resource Block) allocation, frame and subframe number, periodicity, etc. The message, for example, may include an indication of the periodicity (e.g., every 20 ms) of the scheduled UL transmission from wireless device UE-1. If the operating conditions change (e.g., the channel quality changes or a talk spurt ends and UL CoMP reception should be disabled), an updated signal with pre-defined scheduling information can be sent from serving base station BS-1 to the cooperating base station BS-2. Subsequent UL CoMP reception request messages may be transmitted to stop and/or restart UL CoMP reception for wireless device UE-1, and/or to change a periodicity or other parameter of scheduled UL transmissions.

Operation 5-4. Responsive to receiving the pre-defined scheduling information, cooperating base station BS-2 may start receiving UL transmissions from wireless device UE-1 in the serving cell (of serving base station) on the expected transmit occasions given by the pre-defined scheduling information. According to some embodiments, cooperating base station BS-2 may attempt to decode each UL transmission and only transmit decoded bits to serving base station BS-1 if the cyclic redundancy check CRC is successful. According to some other embodiments, cooperating base station BS-2 may transmit decoded bits for a UL transmission if the CRC is successful, and if the CRC fails, cooperating base station BS-2 may transmit soft information values (e.g., IQ data, soft information bits, coded bits after demodulation, etc.) for the UL transmission.

Operation 5-5. UL grants are sent from serving base station BS-1 to wireless device UE-1 as normal. The UL grants may use semi-persistent scheduling or could be sent dynamically for each new transmission. In order to use UL CoMP reception, the scheduled UL grants must match the MCS and PRB allocation and transmission pattern given to cooperating base station BS-2 in the pre-defined scheduling information. Serving base station BS-1 can schedule UL transmissions for wireless device UE-1 on different resources than the pre-defined scheduling information, but there will be no UL CoMP reception gain when wireless device UE-1 is scheduled on different resources than the pre-defined scheduling information because cooperating base station BS-2 will not receive these UL transmissions.

Operation 5-6. Wireless device UE-1 transmits uplink signaling packets as normal based on the UL grants, and each UL signaling packet is received at serving base station BS-1 and possibly also at cooperating base station BS-2 (when the predefined scheduling information is used for the UL grant).

Operation 5-7. If cooperating base station BS-2 decodes an uplink transmission and gets correct CRC decoded information bits (e.g., CRC is successful), cooperating base station BS-2 may send the decoded information bits (fully decoded bits) to serving base station BS-1. If cooperating base station BS-2 does not get correct CRC decoded information bits, cooperating base station BS-2 may send soft information values (e.g., IQ data, soft information bits, coded bits after demodulation, etc.) for each pre-defined scheduling occasion. According to some embodiments, cooperating base station BS-2 may attempt to decode each UL transmission and only transmit decoded bits to serving base station BS-1 if the cyclic redundancy check CRC is successful.

Operation 5-8. Serving base station BS-1 may receive the UL signal from wireless device UE-1 as normal. If the result after unassisted decoding is not correct, serving base station BS-1 can use the result/information (e.g., IQ data, soft information bits, coded bits after demodulation, decoded information bits, etc.) from cooperating base station BS-2 if available. Depending on the delay on the transport network, serving base station BS-1 might schedule unnecessary retransmissions if the result from cooperating base station BS-2 has not yet been received. As discussed in greater detail below, a time for retransmissions may be extended when using TTI bundling so that such unnecessary transmissions can be reduced when CoMP reception is used with TTI bundling.

Variations of operations discussed above may be provided according to additional embodiments as discussed below.

Wireless device UE-1 at a cell edge may use TTI bundling to increase/maximize coverage at low data rates (e.g., for VoIP traffic). Accordingly, it may be beneficial to couple UL CoMP reception according to some embodiments with TTI bundling, so that UL CoMP reception is not used when not using TTI bundling. One advantage may be that TTI bundling uses a longer HARQ round-trip time which increases time available for the transport network latency and/or for CoMP reception processing, thereby reducing a number of unnecessary retransmissions.

Due to delay in the transport network, the pre-defined scheduling information should/must be sent in advance to cooperating base station BS-2. When scheduling uplink grants for a wireless device UE that is using UL CoMP reception in serving base station BS-1, the scheduled MCS and PRB allocation and frame and subframe number should match the pre-defined scheduling information to enable UL CoMP reception at cooperating base station BS-2. Typically, UL CoMP reception will be used when channel conditions are relatively poor because wireless device UE-1 is relatively distant from serving base station BS-1 (at the cell edge) and/or subject to increased interference. Accordingly, in conditions when UL CoMP reception is used, the MCS and PRB allocation likely correspond to a minimum allocation that is used by a coverage limited wireless device UE to increase/maximize robustness while providing a sufficient data rate (e.g., for VoIP traffic). Accordingly, a minimum MCS and PRB allocation may be assumed (by both serving and cooperating base stations) when UL CoMP reception is used so that the scheduled MCS and PRB allocation does not need to be sent with the pre-defined scheduling information, thereby reducing traffic over the transport network.

In cooperating base station BS-2, demodulation and decoding is performed for a transmission hypothesis. If the CRC is correct so that correctly decoded information bits are generated at cooperating base station BS-2, cooperating base station BS-2 may send the decoded information bits to serving base station BS-1. If CRC decoding does not correctly decode information bits at cooperating base station BS-2, cooperating base station BS-2 may send other information such as soft information values (e.g., IQ data, soft information bits, coded bits after demodulation, etc.) to serving base station BS-1. As an alternative, if CRC decoding does not correctly decode the UL transmission at cooperating base station BS-2, cooperating base station BS-2 may not send other information to reduce traffic on the transport network. As another alternative, cooperating base station BS-2 may send soft information values (e.g., IQ data, soft information bits, coded bits after demodulation, etc.) to serving base station BS-1 continuously without attempting decoding. Transmission of soft information values from cooperating base station BS-2 to serving base station BS-1 may improve performance at serving base station BS-1 where soft combining can be performed before joint decoding using the soft information values, but bandwidth usage on the transport network may be increased.

To provide more freedom when scheduling a wireless device UE that is using UL CoMP reception, multiple hypotheses could be provided to cooperating base station BS-2 in the pre-defined scheduling information. Each hypothesis may correspond, for example, to a certain MCS and PRB allocation for a respective data rate. Thus, based on the channel quality for wireless device UE-1 and the available PRB, cooperating base station BS-2 may select one of the hypotheses. The selected hypotheses can be used to improve efficiency, for example, to adapt better to the channel quality and/or to have more efficient PRB usage when there are multiple wireless devices UEs in serving base station BS-1 that is using UL CoMP reception.

Figure 6:
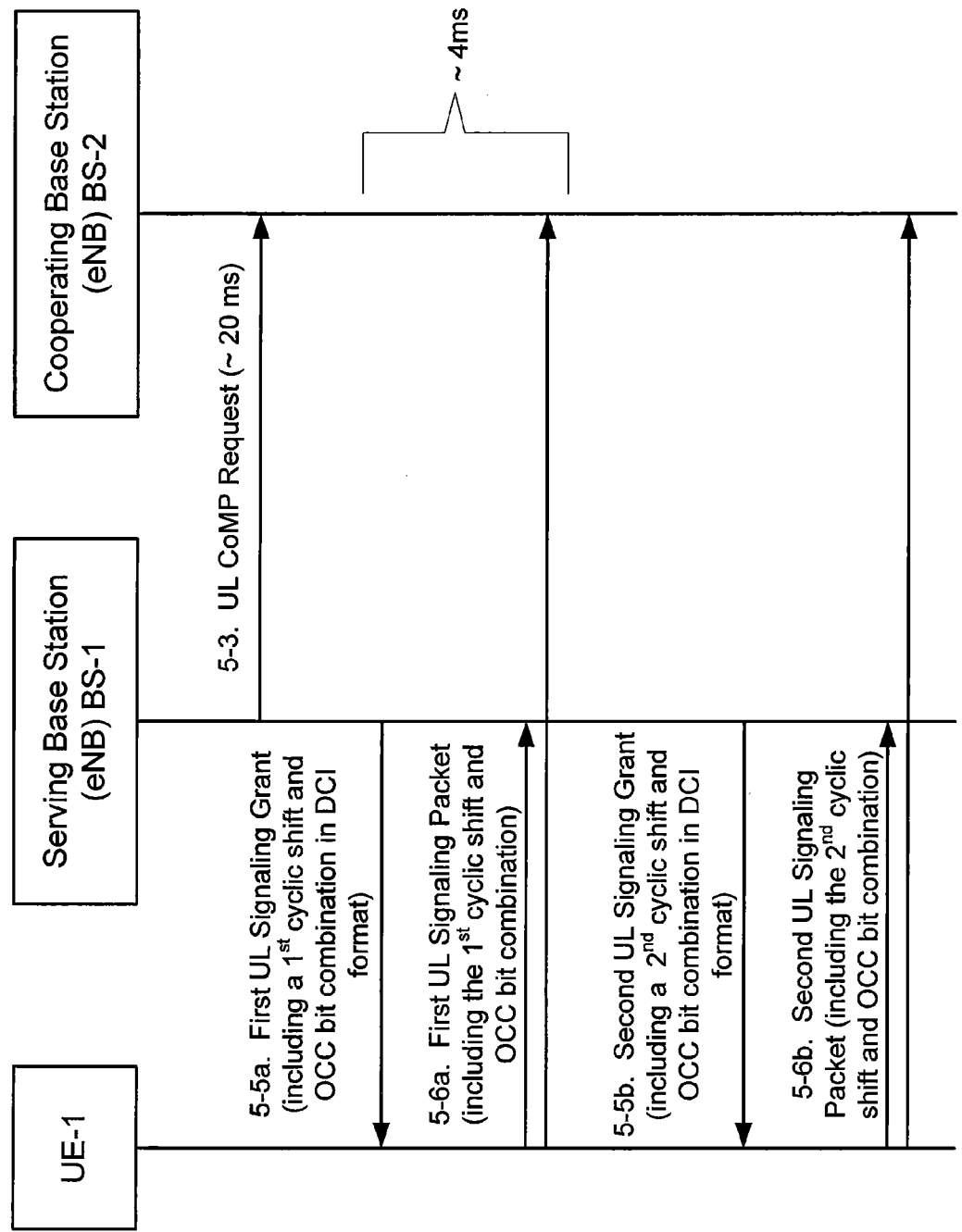
FIG. 6 is a signaling diagram illustrating signaling to support UpLink CoMP according to some embodiments of inventive concepts.

When using multiple hypotheses in cooperating base station BS-2 for a wireless device UE that is using UL CoMP reception, each hypothesis may increase cost in processing and/or memory used to demodulate and decode wireless device UE-1 signal according to the transmission hypothesis. To reduce resource consumption in terms of processing and/or memory, the selected hypothesis in serving base station BS-1 can be signaled by selecting a certain reference signal for the UL transmission. In the UL grant that is sent from serving base station BS-1 to wireless device UE-1, a 3 bit field gives the cyclic shift and OCC (Orthogonal Cover Code) to be used for the reference signals, as shown in FIG. 6. Each transmission hypothesis may correspond to a certain cyclic shift and OCC. By detecting the cyclic shift and OCC of the UL transmission at cooperating base station BS-2 with the highest/maximum signal quality (e.g., SINR), cooperating base station BS-2 can use the detected cyclic shift and OCC to efficiently identify the hypothesis to be used, and cooperating base station BS-2 can use the identified hypothesis to demodulate and decode the UL transmission. Accordingly, cooperating base station BS-2 does not need to demodulate and/or decode the UL transmission using multiple hypotheses thereby reducing resource consumption in the cooperating base station.

FIG. 6 is a signaling diagram illustrating operations of transmitting/receiving a UL CoMP reception request message (e.g., operation 5-3), transmitting/receiving a UL signaling grant (e.g., operation 5-5), and transmitting/receiving a UL signaling packet (e.g., operation 5-6) according to some embodiments. As shown, serving base station BS-1 may transmit a UL CoMP reception request message to cooperating base station BS-2 (e.g., over the X2 interface) at operation 5-3, and serving base station BS-1 may transmit a first UL grant to wireless device UE-1 at operation 5-5a as discussed above with respect to FIG. 5. According to embodiments of FIG. 6, the UL CoMP reception request may include a first hypothesis for a first data rate associated with a first bit combination (e.g., a first cyclic shift and Orthogonal Cover Code OCC bit combination) and a second hypothesis for a second data rate associated with a second bit combination (e.g., a second cyclic shift and Orthogonal Cover Code OCC bit combination). Moreover, the first UL signaling grant of operation 5-5a may specify the first hypothesis for the first data rate, and the first UL signaling grant may include the first bit combination (e.g., the first cyclic shift and Orthogonal Cover Code OCC bit combination). At operation 5-6a, wireless device UE-1 may transmit a first uplink signaling packet (responsive to the first UL signaling grant) according to the first hypothesis for the first data rate, and the first UL signaling packet may include the first bit combination. Accordingly, cooperating base station BS-2 may receive the first UL signaling packet using the first hypothesis for the first data rate responsive to determining that the first UL signaling packet includes the first bit combination.

According to embodiments of FIG. 6, a second UL signaling grant for wireless device UE-1 may specify the second hypothesis for the second data rate, and the second UL signaling grant of operation 5-6b may include the second bit combination (e.g., the second cyclic shift and Orthogonal Cover Code OCC bit combination). At operation 5-6b, wireless device UE-1 may transmit a second uplink signaling packet (responsive to the second UL signaling grant) according to the second hypothesis for the second data rate, and the second UL signaling packet may include the second bit combination. Accordingly, cooperating base station BS-2 may receive the second UL signaling packet using the second hypothesis for the second data rate responsive to determining that the UL signaling packet includes the second bit combination.

According to embodiments discussed above with respect to FIG. 6, a UL CoMP reception request message may include two or more different hypothesis for two or more different data rates allowing some flexibility of different data rates for UL scheduling using the scheduled time slots. By providing different bit combinations that can be included in an UL signaling packet, cooperating base station BS-2 can determine the hypothesis and data rate that should be used to process a given UL transmission without requiring further signaling between serving and cooperating base stations. According to some embodiments, UL signaling grants of operation 5-5 may be transmitted according to a DCI (Downlink Control Information) format, and UL signaling packets of operation 5-6 may be transmitted using sounding, PUSCH (Physical Uplink Shared Channel), and/or PUCCH (Physical Uplink Control Channel) transmissions. Moreover, the bit combinations of a cyclic shift and OCC for the PUSCH may be used to identify respective hypotheses.

In cooperating base station BS-2, the scheduler (e.g., provided by processor 203) can avoid scheduling wireless devices UEs in the PRBs used for UL CoMP reception to improve reception performance for the UL CoMP reception wireless device UE. This may reduce interference in both the serving and cooperating base stations. Alternatively, cooperating base station BS-2 can reduce/avoid scheduling, for example, a wireless device UE that is close to the cell edge towards serving base station BS-1, to reduce interference at serving base station BS-1. In effect, this may provide an ICIC (Inter-cell Interference Coordination) like technique to improve performance for a wireless device UE that is using UL CoMP reception and may be power limited with relatively poor reception in the uplink.

According to some embodiments of inventive concepts, serving base station BS-1 may decide if UL CoMP reception should be used for a particular wireless device UE-1. If UL CoMP reception is to be used for wireless device UE-1, serving base station BS-1 sends pre-defined scheduling information to a cooperating base station BS-2 (or cooperating base stations BS-2 and BS-3). Cooperating base station BS-2 then demodulates and decodes UL transmissions from wireless device UE-1 that match the pre-defined scheduling information, and sends decoded information bits for the UL transmission to serving base station BS-1 if the CRC is correct. If the CRC is not correct at cooperating base station BS-2, cooperating base station BS-2 may send soft information values (e.g., IQ data, soft information bits, coded bits after demodulation, etc.) for the UL transmission to serving base station BS-1. The soft information values may be used by serving base station BS-1 to provide combining and/or joint processing, baseband processing, demodulation, and/or decoding when processing the UL transmission from wireless device UE-1.

The pre-defined scheduling information may correspond to an MCS, a PRB allocation, and/or a time slot(s).

Serving base station BS-1 may send multiple hypothesis for the MCS and PRB allocation in the pre-defined scheduling information. Moreover, the cyclic shift and OCC may be used to signal the hypothesis used to thereby reduce resource consumption in cooperating base station BS-2 and/or to reduce traffic between base stations. For example, each MCS/PRB allocation in the pre-defined scheduling may be associated with a particular cyclic shift and OCC combination. Serving base station BS-1 may thus designate a particular cyclic shift and OCC combination in each UL grant for the CoMP reception wireless device UE-1, and cooperating base station BS-2 may detect the cyclic shift and OCC combination in the UL transmission to determine which MCS and PRB allocation from the pre-defined scheduling information should be used for demodulation and decoding.

In addition, cooperating base station BS-2 may use the pre-defined scheduling information from serving base station BS-1 to reduce/avoid scheduling on the PRBs that are used for UL CoMP reception, either for all wireless devices UEs in a cell of cooperating base station BS-2 or for those wireless devices UEs that are more likely to cause high interference in/for serving base station BS-1.

Moreover, UL CoMP reception and related scheduling may only be performing when TTI bundling is activated for a wireless device UE.

Operations of serving base station BS-1 will be discussed with reference to the flow charts of FIGS. 7A, 7B, 7C, and 7D. In the following remarks, elements of serving base station BS-1 will be identified as transceiver 201-1, processor 203-1, network interface 205-1, and memory 207-1. Similarly, elements of cooperating base station BS-2 will be identified as transceiver 201-2, processor 203-2, network interface 205-2, and memory 207-2.

At block 701 of FIG. 7A, processor 203-1 may select wireless device UE-1 for UL CoMP reception. Processor 203-1 may use measurement reports received from wireless device UE-1 through transceiver 201-1 to determine that UL CoMP reception is appropriate for wireless device UE-1. For example, wireless device UE-1 may transmit measurement reports (e.g., reporting signal quality for downlink DL signals received at wireless device UE-1 from neighboring base stations) as part of an A3 event.

Figure 7C:
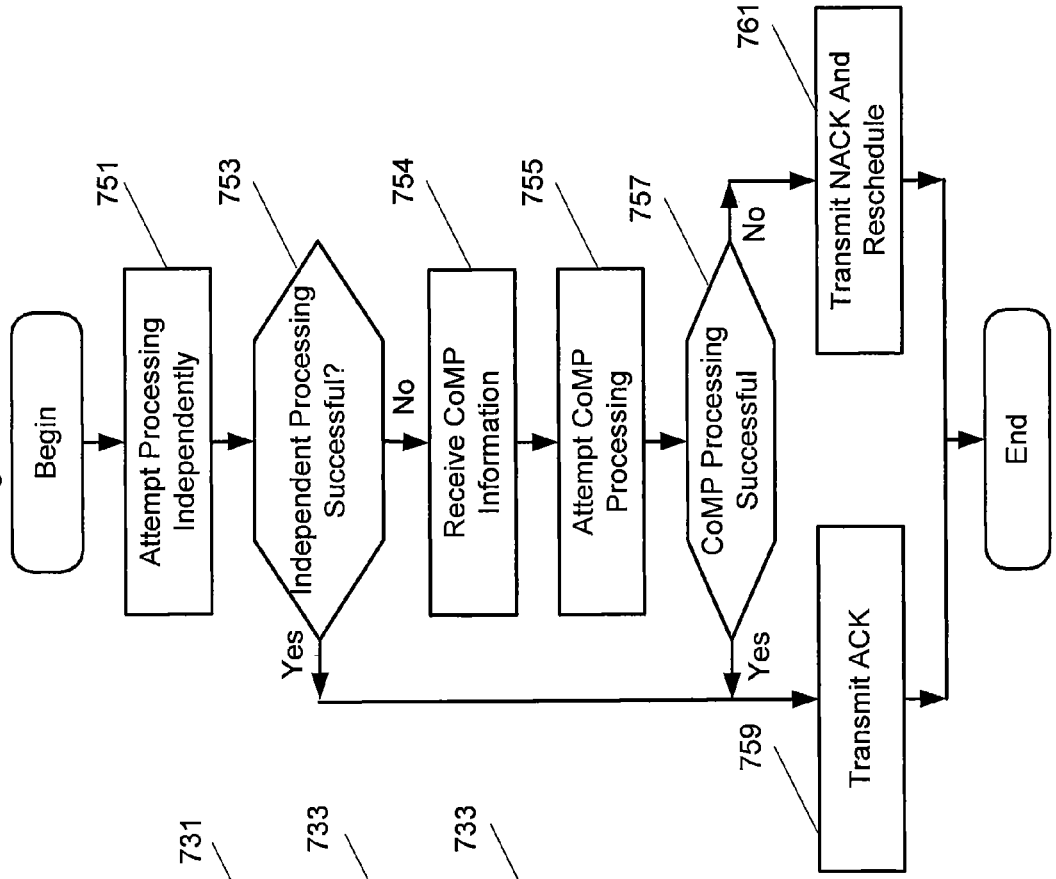
Figure 7B:
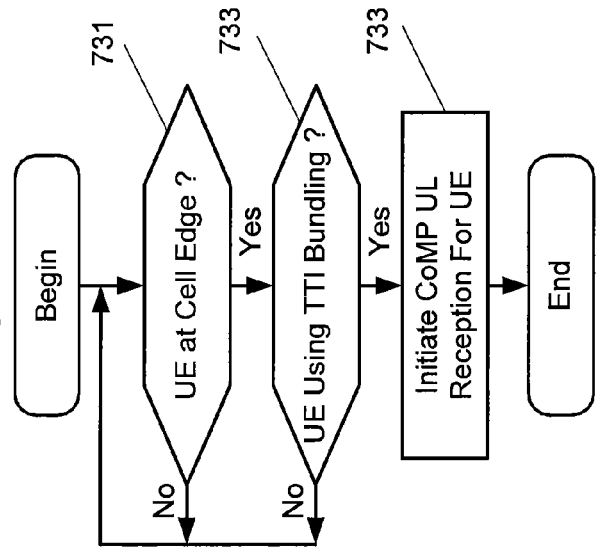

More detailed operations of selection are illustrated by way of example in FIG. 7B. Responsive to determining that wireless device UE-1 is at a cell edge adjacent to cooperating base station BS-2 at block 731 and responsive to determining that wireless device UE-1 is being subject to TTI bundling, processor 203-1 may initiate UL CoMP reception for wireless device UE-1 at block 733 (and return to blocks 701 and 703 of FIG. 7A). While cell edge and TTI bundling are discussed by way of example, other criteria to initiate UL CoMP reception may be used. For example, processor 203-1 may initiate UL CoMP reception responsive to determining that wireless device UE-1 is at a cell edge without regard to TTI bundling. According to some other embodiments, processor 203-1 may initiate UL CoMP reception responsive to determining that UL transmissions from the wireless device are interference limited (i.e., interference dominates over noise and wireless device UE-1 is not power limited). In a high traffic and high interference situation, for example, UL transmissions from wireless device UE-1 may be subject to significant interference even though wireless device UE-1 is not power limited, and UL CoMP reception may be used to improve reception at the network. According to still other embodiments, processor 203-1 may initiate UL CoMP reception responsive to determining that UL transmissions from wireless device UE-1 are interference limited and that wireless device UE-1 is at a cell edge adjacent to cooperating base station BS-2.

At block 703 of FIG. 7A, processor 203-1 may identify a base station or base stations (e.g., base station BS-2) as providing service in a cell adjacent to wireless device UE-1 and thus appropriate to serve as a cooperating base station for UL CoMP reception. For example, wireless device UE-1 may transmit measurement reports (e.g., reporting signal quality for downlink DL signals received from neighboring base stations) as part of an A3 event, and processor 203-1 may use these measurement reports to identify base station BS-2 as a cooperating base station for UL CoMP reception. While one cooperating base station BS-2 is discussed by way of example, UL CoMP reception may be performed using multiple cooperating base stations (e.g., base stations BS-2 and BS-3).

At block 705, processor 203-1 may transmit scheduling information for wireless device UE-1 through network interface 205-1 to the selected cooperating base station BS-2, and the scheduling information may define a plurality of time slots for UpLink UL transmission from wireless device UE-1 to the communications network. More particularly, the scheduling information may define a plurality of periodic time slots for UL transmission from the wireless device. The scheduling information may also include at least one of a Physical Cell Identity (PCI) for serving base station BS-1, a Cell Radio Network Temporary Identifier (C-RNTI) for wireless device UE-1, a modulation and coding scheme (MCS), a Physical Resource Block (PRB) allocation, a System Frame Number (SFN), a subframe number, a cyclic shift, a periodic Channel Quality Indication (CQI) configuration, and/or a periodicity of the plurality of time slots of the scheduling information. At block 707, processor 203-1 may loop back to block 705, for example, if there is a change in the scheduling information to be used for future UL CoMP reception.

After transmitting the scheduling information to cooperating base station BS-2, processor 203-1 may transmit a UL signaling grant to wireless device UE-1 for one of the plurality of time slots defined by the scheduling information at block 709. The scheduling grant may also define at least one of a Physical Cell Identity (PCI) for serving base station BS-1, a Cell Radio Network Temporary Identifier (C-RNTI) for wireless device UE-1, a modulation and coding scheme (MCS), a Physical Resource Block (PRB) allocation, a System Frame Number (SFN), a subframe number, a cyclic shift, and/or a periodic Channel Quality Indication (CQI) configuration.

At block 711, processor 203-1 may receive a UL transmission from wireless device UE-1 through transceiver 201-1 over the time slot of the UL signaling grant. If the signaling grant defines a time slot from the plurality of time slots of the scheduling information, cooperating base station BS-2 will/may provide information relating to the UL transmission. If the signaling grant defines a time slot that is not one of the plurality of time slot of the scheduling information, cooperating base station will/may not provide information relating to the UL transmission.

Responsive to the time slot of the signaling grant being from the plurality of time slots of the scheduling information at block 715 (so that cooperating base station BS-2 will/may provide information relating to the UL transmission), processor 203-1 may process the UL transmission from wireless device UE-1 using the information from cooperating base station 203-1 relating to the UL transmission from the wireless device at block 717. The information from cooperating base station BS-2 may include at least one of decoded information bits and/or soft information values (e.g., at least one of IQ data used for baseband processing, soft information bits used for decoding, and/or coded information bits used for decoding) for the UL transmission from wireless device UE-1. Responsive to the time slot of the signaling grant not being from the plurality of time slots of the scheduling information at block 715 (so that cooperating base station BS-2 will/may not provide information relating to the UL transmission), processor 203-1 may process the UL transmission from wireless device UE-1 independently at block 719.

Operations of block 717 according to some embodiments are discussed in greater detail with respect to the flow chart of FIG. 7C. As discussed above, the decision of block 715 may be based on an expectation of whether information from cooperating base station BS-2 for the UL transmission is expected based on whether the UL grant of block 709 was for a time slot defined by the scheduling information of block 705 or not. Responsive to the time slot being for a time slot defined by the scheduling information of block 705 at block 715, processor 203-1 may attempt independent processing (e.g., including baseband processing, demodulation, and/or decoding) of the UL transmission (without using information from cooperating base station BS-2). Accordingly, independent processing (e.g., including baseband processing, demodulation, and decoding) at block 751 may be initiated before receiving information from cooperating base station BS-2, thereby increasing a speed of processing if the UL transmission can be successfully decoded independently.

If processor 203-1 is successful independently processing the UL transmission (e.g., the decoded bits pass cyclic redundancy check CRC) at block 753, processor 203-1 may transmit an Acknowledgment ACK at block 759 and return to operations of FIG. 7A at blocks 717 and 707. If processor 203-1 is not successful independently decoding the UL transmission at block 753, processor 203-1 may receive information from cooperating base station BS-2 regarding the UL transmission (referred to as CoMP information) at block 754 and attempt jointly processing (also referred to as CoMP processing) the UL transmission at block 755 using information from serving and cooperating base stations BS-1 and BS-2.

Information from cooperating base station BS-2 may include decoded information bits for which CRC has passed, IQ data used for baseband processing, soft information bits used for decoding, and/or coded information bits used for decoding. If decoded information bits are received from cooperating base station BS-2, processor 203-1 may use the decoded information bits at block 755 so that CoMP processing is successful at block 757, and processor 203-1 may transmit an acknowledge ACK through transceiver 201-1 at block 759. While receiving CoMP information is shown after attempting independent processing at block 751, CoMP information for the UL transmission may be received at any time after transmitting the UL grant at block 709.

If only soft values (e.g., IQ data, soft information bits, and/or coded information bits) are received from cooperating base station BS-2, processor 203-1 may attempt jointly processing at block 755 using at least one of: joint baseband processing using IQ data from cooperating base station BS-2 and IQ data from serving base station BS-1; joint demodulation using soft information bits from cooperating base station BS-2 and soft information bits from serving base station BS-1; and/or joint decoding using coded information bits from cooperating base station BS-2 and coded information bits from serving base station BS-2. If CoMP processing results in successful decoding at block 757, processor 203-1 may transmit an ACK (through transceiver 201) to wireless device UE-1 at block 759 and return to blocks 717 and 707 of FIG. 7A. If CoMP processing does not result in successful decoding at block 757, processor 203-1 may transmit a negative Acknowledgment (through transceiver 201) to wireless device UE-1 at block 761 and return to blocks 717 and 707 of FIG. 7A.

Operations of block 717 according to some other embodiments are discussed in greater detail with respect to the flow chart of FIG. 7D. Operations of blocks 751, 753, 755, 757, 759, and 761 may be the same as or similar to corresponding blocks of FIG. 7C, and discussion thereof with respect to FIG. 7D may be reduced/omitted for the sake of conciseness.

In some cases, there may be significant backhaul delay (e.g., >~5 ms) between serving and cooperating base stations BS-1 and BS-2 before information regarding the UL transmission is received at serving base station BS-1 from cooperating base station BS-2. Accordingly, if independent processing of the UL transmission does not result in successfully decoded information bits at block 753, processor 203-1 may determine at block 754 if information regarding the UL transmission (referred to as CoMP information/data) has been received from cooperating base station BS-2. If the CoMP information has been received from cooperating base station BS-2 at block 754, processor 203-1 can proceed at blocks 755, 757, 759, and/or 761 as discussed above with respect to FIG. 7C before possibly rescheduling a retransmission. If information regarding the UL transmission (referred to as CoMP data) has not been received at block 754, processor 203-1 may transmit a NACK to wireless device UE-1 and reschedule the uplink transmission at block 771, receive the UL retransmission from wireless device UE-1 at block 773, and attempt independent processing of the UL retransmission at block 775.

If independent processing of the UL retransmission is successful (e.g., decoding is successful) at block 753, processor 203-1 may transmit an Ack at block 759. If independent processing of the UL retransmission does not result in successfully decoded information bits at block 753, processor 203-1 may determine at block 754 if CoMP information regarding the UL transmission (referred to as CoMP information/data) has been received from cooperating base station BS-2. If the CoMP information has been received from cooperating base station BS-2 at block 754, processor 203-1 can proceed with CoMP processing the UL retransmission at blocks 755, 757, 759, and/or 761 as discussed above with respect to FIG. 7C before possibly rescheduling another retransmission. In FIG. 7D, a number of attempts processing a UL retransmissions at blocks 771, 773, 775, and 753 and at blocks 755 and 757 may be limited.

Using one transmission of scheduling information from serving base station BS-1 to cooperating base station BS-2, operations of FIGS. 7A, 7B, 7C, and/or 7D may be repeated for any number of subsequent UL transmissions from wireless device UE-1. Accordingly, a backhaul transmission between serving and cooperating base stations BS-1 and BS-2 is not required from every UL transmission from wireless device UE-1 for which CoMP reception is desired.

According to some embodiments, two or more hypotheses for respective different data rates may be included in the scheduling information of block 705 to accommodate some flexibility in UL scheduling to accommodate changing channel conditions without requiring transmission of new scheduling information to cooperating base station BS-2. More particularly, each hypothesis may be associated with a respective bit combination (e.g., a respective cyclic shift and Orthogonal Cover Code OCC bit combination), and the respective bit combinations may be included in the scheduling information to allow cooperating base station BS-2 to understand which bit combination is associated with which hypothesis. Moreover, each scheduling grant at block 709 may identify one of the hypotheses and may include the respective bit combination, and wireless device UE-1 may transmit each respective UL transmission in accordance with the hypothesis and data rate of the grant with the UL transmission including the respective bit combination. Cooperating base station BS-2 may thus use the bit combination in the UL transmission to determine the hypothesis and data rate to be used to receive the UL transmission.

By way of example, processor 203-1 may transmit the scheduling information for wireless device UE-1 through network interface 205-1 to cooperating base station BS-2 at block 705. As discussed above, the scheduling information may define a plurality of time slots for UpLink UL transmission from wireless device UE-1 to the communications network. In addition, the scheduling information may include/identify a first hypothesis for a first data rate, a second hypothesis for a second data rate different than the first data rate, a first bit combination (e.g., a first cyclic shift and Orthogonal Cover Code OCC bit combination) associated with the first hypothesis, and a second bit combination (a second cyclic shift and OCC bit combination) associated with the second hypothesis.

After transmitting the scheduling information to cooperating base station BS-2, processor 203-1 may transmit a first UL signaling grant through transceiver 201-1 to wireless device UE-1 at block 709. More particularly, the first UL signaling grant may provide scheduling according to the first hypothesis for the first data rate for a first time slot of the plurality of time slots defined by the scheduling information, and the signaling grant may include the first bit combination. At block 711, processor 203-1 may receive a first UL transmission through transceiver 201-1 from wireless device UE-1 over the time slot of the first UL signaling grant according to the first data rate of the first hypothesis, and the first UL transmission may include the first bit combination. At block 754, processor 203-1 may receive information through network interface 205-1 from cooperating base station BS-2 relating to the first UL transmission from wireless device UE-1 over the first time slot of the UL signaling grant, and at block 755, processor 203-1 may process the first UL transmission from wireless device UE-1 using the information from cooperating base station BS-1 relating to the first UL transmission from wireless device UE-1.

After transmitting the scheduling information to cooperating base station BS-2 and after processing the first UL transmission, at block 709, processor 203-1 may transmit a second UL signaling grant through transceiver 201-1 to wireless device UE-1 for a second one of the plurality of time slots defined by the scheduling information, but the second UL signaling grant may be for the second data rate of the second hypothesis. Stated in other words, the second signaling grant may provide scheduling according to the second hypothesis for the second data rate for the second time slot, and the signaling grant may include the second bit combination. At block 711, processor 203-1 may receive a second UL transmission from wireless device UE-1 through transceiver 201-1 over the second time slot of the second UL signaling grant at the second data rate of the second hypothesis, and the second UL transmission may include the second bit combination. At block 754, processor 203-1 may receive information through network interface 205-1 from cooperating base station BS-2 relating to the second UL transmission from wireless device UE-1 over the second time slot of the UL signaling grant. At block 755, processor 203-1 may process the second UL transmission from the wireless device using the information from cooperating base station BS-2 relating to the second UL transmission from the wireless device.

By providing a different hypotheses for different data rates in the signaling grant and by providing respective different bit combinations that wireless device UE-1 can include in the UL transmission, serving base station BS-1 can schedule different data rates for different time slots that are defined for UL CoMP reception signaling without requiring additional communications between serving and cooperating base stations BS-1 and BS-2.

According to some embodiments, processor 203-1 may transmit scheduling information for wireless device UE-1 through network interface 205-1 to cooperating base station BS-2 at block 705 wherein the scheduling information defines a plurality of time slots for UpLink transmission from wireless device UE-1 to the communications network. After transmitting the scheduling information, processor 203-1 may transmit a first UL signaling grant through transceiver 201-1 to wireless device UE-1 for a first one of the plurality of time slots defined by the scheduling information at block 709. At block 711, processor 203-1 may receive a first UL transmission from wireless device UE-1 through transceiver 201-1 over the first time slot of the UL signaling grant, and at block 754, processor 203-1 may receive information from cooperating base station BS-2 relating to the first UL transmission from wireless device UE-1 over the first time slot of the first UL signaling grant. At block 755, processor 203-1 may process the first UL transmission from wireless device UE-1 using the information from cooperating base station BS-2 relating to the first UL transmission from wireless device UE-1.

After transmitting the scheduling information to cooperating base station BS-2 and after transmitting the first scheduling grant, at block 709, processor 203-1 may transmitting a second UL signaling grant through transceiver 201-1 to wireless device UE-1 for a second time slot, wherein the second time slot is not included in the plurality of time slots of the scheduling information. At block 711, processor 203-1 may then receive a second UL transmission from wireless device UE-1 through transceiver 201-1 over the second time slot of the second signaling grant. At block 719, processor may independently processing the second UL transmission without using information from the second node. UL transmissions from wireless device UE-1 may thus be scheduled in time slots other than those indicated in the scheduling information but CoMP information from cooperating base station BS-2 may be unavailable.

While embodiments have been discussed above using a single cooperating base station BS-2 for ease of explanation, embodiments may be implemented using multiple cooperating base stations. For example, at block 705, processor 203-1 may also transmit the scheduling information through network interface 205-1 to cooperating base station BS-3 in addition to cooperating base station BS-2. At block 754, processor 203-1 may receive information relating to the UL transmission from wireless device UE-1 over the time slot of the UL signaling grant from both cooperating base stations BS-2 and BS-3. At block 755, processor 203-1 may process the UL transmission from the wireless device using the information from both cooperating base stations BS-2 and BS-3 relating to the UL transmission from wireless device UE-1.

Operations of cooperating base station BS-2 will now be discussed with reference to the flow chart of FIG. 8. At block 801, cooperating base station BS-2 may receive scheduling information for the wireless device (UE-1 through network interface 205-1 from serving base station BS-1 as discussed above with respect to block 705, the scheduling information defines a plurality of time slots for UpLink transmission from wireless device UE-1 to the communications network. As discussed above, the scheduling information may define a plurality of periodic time slots for UL transmission from the wireless device. The scheduling information may also include at least one of a physical cell identify PCI for serving base station BS-1, a Cell Radio Network Temporary Identifier C-RNTI for wireless device UE-1, a modulation and coding scheme MCS, a Physical Resource Block PRB allocation, a System Frame Number SFN, a subframe number, a cyclic shift, a periodic Channel Quality Indication CQI configuration, and/or a periodicity of the plurality of time slots of the scheduling information.

Responsive to receiving the scheduling information at block 801, processor 205-2 may monitor for UL transmissions from wireless device UE-1 during the plurality of time slots defined by the scheduling information of block 801. At block 805, processor 205-2 may thus receive a UL transmission through transceiver 201-2 from wireless device UE-1 over one of the plurality of time slots defined by the scheduling information.

Responsive to receiving a UL transmission from wireless device UE-1 at block 805, processor 203-2 may process the UL transmission from wireless device UE-1 at block 807. Processor 203-2, for example, may independently perform baseband processing, demodulation, and/or decoding on the UL transmission. Processor 203-2 may thus generate IQ data, soft data bits, coded information bits, and/or decoded information bits for the UL transmission from wireless device UE-1.

Responsive to processor 203-2 generating decoded information bits for the UL transmission that pass the cyclic redundancy check CRC at block 715, processor 203-2 may transmit the successfully decoded information bits through network interface 205-2 to serving base station BS-1 at block 811. Responsive to processor 203-2 failing to successfully decode the UL transmission (e.g., the decoded information bits to not pass CRC) at block 809, processor 203-2 may transmit soft information values (e.g., IQ data, soft data bits, and/or coded information bits) through network interface 205-2 to serving base station BS-1.

If revised scheduling information is received (through network interface 205-2) for wireless terminal UE-1 from serving base station BS-1 at block 817, processor 203-2 may update scheduling information at block 819 and resume monitoring for UL transmissions at blocks 803 and 805 according to the updated scheduling information. Otherwise, processor 203-2 may resume monitoring for UL transmissions at blocks 803 and 805 according to the original scheduling information.

According to some embodiments, processor 203-2 may receive receiving scheduling information for wireless device UE-1 through network interface 205-2 at block 801 wherein the scheduling information defines a plurality of time slots for UpLink transmission from wireless device UE-1 to the communications network. More particularly, the scheduling information may include a first hypothesis for a first data rate and a second hypothesis for a second data rate different than the first data rate. Moreover, the scheduling information may associate the first hypothesis with a first bit combination (e.g., a first cyclic shift and Orthogonal Cover Code OCC bit combination), and the scheduling information may associate the second hypothesis with a second bit combination (e.g., a second cyclic shift and Orthogonal Cover Code OCC bit combination).

After receiving the scheduling information from serving base station BS-1, processor 203-2 may receive a first UL transmission from wireless device UE-1 through transceiver 201-2 over a first of the plurality of time slots defined by the scheduling information at block 805. Responsive to the first UL transmission including the first bit combination (e.g., the first cyclic shift and OCC bit combination), processor 203-2 may receive and/or process the first UL transmission at the first data rate of the first hypothesis at blocks 805 and 807. At blocks 809, 811, and/or 815, processor 203-2 may transmit information relating to the UL transmission from wireless device UE-1 over the time slot of the UL signaling grant, wherein the information is transmitted through network interface 205-2 to serving base station BS-1.

After receiving the scheduling information at cooperating base station BS-2 and after receiving the first UL transmission, processor 203-2 may receive a second UL transmission from wireless device UE-1 through transceiver 201-2 over a second one of the plurality of time slots defined by the scheduling information at block 805 and process the second UL transmission at block 807. More particularly, the second UL transmission may be received/processed at the second data rate of the second hypothesis responsive to the second UL transmission including the second bit combination (e.g., the second cyclic shift and OCC bit combination). Processor 203-2 may then transmit information relating to the second UL transmission from wireless device UE-1 over the second time slot at blocks 809, 811, and/or 815, with the information being transmitted through network interface 205-2 to serving base station BS-1.

According to embodiments discussed above, processor 203-2 may transmit decoded information bits through network interface 205-2 to serving base station BS-1 at block 811 if the UL transmission is successfully decoded, or processor 203-2 may transmit soft information values through network interface 205-2 to serving base station BS-1 at block 815 if the UL transmission is not successfully decoded. According to some other embodiments, processor may transmit decoded information bits through network interface 205-2 to serving base station BS-1 at block 811 if the UL transmission is successfully decoded, or processor 203-2 may block (omit) transmission of any information for the UL transmission if the UL transmission is not successfully decoded.

According to examples discussed above, base station BS-1 is a serving base station for wireless device UE-1 and base station BS-2 is a cooperating base station for wireless device UE-1. It will be understood that roles of base stations BS-1 and BS-2 may be reversed for the same or a different wireless device. Moreover, a same base station may be a serving base station for one wireless device and a cooperating base station for another wireless device at the same time. For example, base station BS-1 may be a serving base station for wireless device UE-1 and a cooperating base station for wireless device UE-2, and base station BS-2 may be a serving base station for wireless device UE-2 and a cooperating base station for wireless device UE-1.

Abbreviations
C-RNTI Cell Radio Network Temporary Identifier
CoMP Coordinated Multi-Point
CRC Cyclic Redundancy Check
DCI Downlink Control Information
ICIC Inter-cell Interference Coordination
IRC Interference Rejection Combining
MCS Modulation and Coding Scheme
MRC Maximal Ratio Combining
OCC Orthogonal Cover Code
PCI Physical Cell Identity
PRB Physical Resource Block
PUCCH Physical Uplink Control Channel
PUSCH Physical Uplink Shared Channel
SINR Signal to Interference plus Noise Ratio
TTI Transmission Time Interval
Further Definitions When an element is referred to as being "connected", "coupled", "responsive", or variants thereof to another element, it can be directly connected, coupled, or responsive to the other element or one or more intervening elements may be present. In contrast, when an element is referred to as being "directly connected", "directly coupled", "directly responsive", or variants thereof to another element, there are no intervening elements present. Like numbers refer to like nodes/elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or", abbreviated "/", includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but do not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. Examples of embodiments of aspects of present inventive concepts explained and illustrated herein include their complimentary counterparts. The same reference numerals or the same reference designators denote the same or similar elements throughout the specification.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit (also referred to as a processor) of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of present inventive concepts may be embodied in hardware and/or in software (including firmware, resident software, microcode, etc.) that runs on a processor (also referred to as a processor circuit) such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Other network elements, communication devices and/or methods according to embodiments of inventive concepts will be or become apparent to one with skill in the art upon review of the present drawings and description. It is intended that all such additional network elements, devices, and/or methods be included within this description, be within the scope of the present inventive concepts. Moreover, it is intended that all embodiments disclosed herein can be implemented separately or combined in any way and/or combination.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended claims are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the following claims and their equivalents, and shall not be restricted or limited by the foregoing detailed description.

That which is claimed is:

1. A method of operating a first node providing communication with a wireless device in a communications network including the first node and a second node, the method comprising:

transmitting scheduling information for the wireless device from the first node to the second node wherein the scheduling information defines a plurality of time slots for UpLink (UL) transmission from the wireless device to the communications network, wherein the scheduling information includes a first hypothesis for a first data rate associated with the plurality of time slots for UL transmission and a second hypothesis for a second data rate associated with the plurality of time slots for UL transmission different than the first data rate;

after transmitting the scheduling information to the second node, transmitting a UL signaling grant to the wireless device for one of the plurality of time slots defined by the scheduling information;

receiving a UL transmission from the wireless device at the first node over the time slot of the UL signaling grant, wherein the UL signaling grant is a first UL signaling grant, wherein the time slot of the first UL signaling grant is a first time slot of the plurality of time slots, wherein the UL transmission is a first UL transmission, wherein the first UL signaling grant is a grant for the first data rate of the first hypothesis, wherein transmitting the first UL signaling grant comprises transmitting the first uplink signaling grant after transmitting the scheduling information including the first hypothesis and the second hypothesis to the second node, and wherein receiving the first UL transmission comprises receiving the first UL transmission at the first data rate of the first hypothesis;

receiving information from the second node relating to the UL transmission from the wireless device over the time slot of the UL signaling grant;

processing the UL transmission from the wireless device at the first node using the information from the second node relating to the UL transmission from the wireless device;

after transmitting the scheduling information including the first hypothesis and the second hypothesis to the second node and after transmitting the first UL signaling grant, transmitting a second UL signaling grant to the wireless device for a second one of the plurality of time slots defined by the scheduling information, wherein the second UL signaling grant is for the second data rate of the second hypothesis;

receiving a second UL transmission from the wireless device at the first node over the second time slot of the second UL signaling grant at the second data rate of the second hypothesis;

receiving information from the second node relating to the second UL transmission from the wireless device over the second time slot of the UL signaling grant; and processing the second UL transmission from the wireless device at the first node using the information from the second node relating to the second UL transmission from the wireless device.

2. The method of claim 1, wherein transmitting the scheduling information comprises transmitting the scheduling information responsive to determining that the wireless device is at a cell edge adjacent to the second node and responsive to the wireless device being subject to Transmission Time Interval (TTI) bundling.

3. The method of claim 1 wherein transmitting the scheduling information comprises transmitting the scheduling information responsive to determining that UL transmissions from the wireless device are interference limited such that interference dominates over noise.

4. The method of claim 1 wherein the first hypothesis is associated with a first bit combination, wherein the second hypothesis is associated with a second bit combination, wherein the first UL signaling grant includes the first bit combination, and wherein the second UL signaling grant includes the second bit combination.

5. The method of claim 4 wherein the first bit combination is a first cyclic shift and Orthogonal Cover Code (OCC) bit combination, and wherein the second bit combination is a second cyclic shift and OCC bit combination.

6. The method of claim 1, wherein the UL signaling grant is a first UL signaling grant, wherein the time slot of the UL signaling grant is a first time slot of the plurality of time slots, and wherein the UL transmission is a first UL transmission, the method further comprising:
after transmitting the scheduling information to the second node, transmitting a second UL signaling grant to the wireless device for a second time slot, wherein the second time slot is not included in the plurality of time slots of the scheduling information;
receiving a second UL transmission from the wireless device at the first node over the second time slot of the second signaling grant; and
independently processing the second UL transmission without using information from the second node.

7. The method of claim 1, wherein processing comprises jointly processing the uplink transmission using the information from the second node, the method further comprising:
independently processing the UL transmission from the wireless device without using the information from the second node;
wherein jointly processing the UL transmission from the wireless device using the information from the second node comprises jointly processing responsive to failure decoding the UL transmission when independently processing the UL transmission.

8. The method of claim 1, wherein the information from the second node comprises at least one of decoded information bits and soft information values for the UL transmission from the wireless device.

9. The method of claim 8 wherein the soft information values comprise at least one of IQ data used for baseband processing, soft information bits used for decoding, and coded information bits used for decoding.

10. The method of claim 1, wherein processing the uplink transmission comprises at least one of jointly demodulating and jointly decoding the uplink transmission from the wireless device using the information from the second node.

11. The method of claim 1, wherein the scheduling information defines a plurality of periodic time slots for UL transmission from the wireless device.

12. The method of claim 1, wherein the scheduling information includes at least one of a physical cell identity (PCI) for the first node, a Cell Radio Network Temporary Identifier (C-RNTI) for the wireless device, a modulation and coding scheme (MCS), a Physical Resource Block (PRB) allocation, a System Frame Number (SFN), a subframe number, a cyclic shift, a periodic Channel Quality Indication (CQI) configuration, and a periodicity of the plurality of time slots of the scheduling information.

13. A method of claim 1, wherein the communication network is a Radio Access Network, RAN, wherein the first node is a serving base station for the wireless device, wherein the second node is a cooperating base station for the wireless device, and wherein processing the UL transmission comprises processing the UL transmission from the wireless device using Coordinated Multipoint (CoMP) reception.

14. A method of claim 1, wherein the communication network includes a third node, the method further comprising:
transmitting the scheduling information for the wireless device from the first node to the third node;
receiving information from the third node relating to the UL transmission from the wireless device over the time slot of the UL signaling grant; and
processing the UL transmission from the wireless device at the first node using the information from the second and third nodes relating to the UL transmission from the wireless device.

15. A method of operating a first node in a communications network including the first node and a second node providing communication with a wireless device, the method comprising:
receiving scheduling information for the wireless device at the first node from the second node wherein the scheduling information defines a plurality of time slots for UpLink (UL) transmission from the wireless device to the communications network;
after receiving the scheduling information from the second node, receiving a UL transmission from the wireless device at the first node over one of the plurality of time slots defined by the scheduling information;
processing the UL transmission from the wireless device at the first node; and
transmitting information relating to the UL transmission from the wireless device over the time slot of the UL signaling grant, wherein the information is transmitted from the first node to the second node, wherein the time slot of the first UL transmission from the wireless device is a first time slot of the plurality of time slots of the scheduling information, wherein the scheduling information includes a first hypothesis for a first data rate associated with the plurality of time slots and a second hypothesis for a second data rate associated with the plurality of time slots different than the first data rate, and wherein receiving the first UL transmission comprises receiving the first UL transmission at the first data rate of the first hypothesis after receiving the scheduling information including the first hypothesis and the second hypothesis,
after receiving the scheduling information including the first hypothesis and the second hypothesis at the first node from the second node and after receiving the first UL transmission, receiving a second UL transmission from the wireless device at the first node over a second one of the plurality of time slots defined by the scheduling information, wherein the second UL transmission is received at the second data rate of the second hypothesis;
processing the second UL transmission from the wireless device at the first node; and
transmitting information relating to the second UL transmission from the wireless device over the second time slot, wherein the information is transmitted from the first node to the second node.

16. The method of claim 15 wherein the scheduling information associates the first hypothesis with a first bit combination, wherein the scheduling information associates the second hypothesis with a second bit combination, wherein the first UL transmission from the wireless device includes the first bit combination, and wherein the second UL transmission from the wireless device includes the second bit combination, wherein processing the first UL transmission comprises processing the first UL transmission according to the first hypothesis for the first data rate responsive to receiving the first bit combination with the first UL transmission, and
wherein processing the second UL transmission comprises processing the second UL transmission according to the second hypothesis for the second data rate responsive to receiving the bit combination with the second UL transmission.

17. The method of claim 16 wherein the first bit combination is a first cyclic shift and Orthogonal Cover Code (OCC) bit combination, and wherein the second bit combination is a second cyclic shift and OCC bit combination.

18. The method of claim 15, wherein the information relating to the UL transmission comprises at least one of decoded information bits and soft information values for the UL transmission from the wireless device.

19. The method of claim 18 wherein the soft information values comprise at least one of IQ data used for baseband processing, soft information bits used for decoding, and coded information bits used for decoding.

20. The method of claim 15, wherein the scheduling information defines a plurality of periodic time slots for UL transmission from the wireless device.

21. The method of claim 15, wherein the scheduling information includes at least one of a physical cell identity (PCI) for the second node, a Cell Radio Network Temporary Identifier (C-RNTI) for the wireless device, a modulation and coding scheme (MCS), a Physical Resource Block (PRB) allocation, a System Frame Number (SFN), a subframe number, a cyclic shift, a periodic Channel Quality Indication (CQI) configuration, and a periodicity of the plurality of time slots of the scheduling information.

22. A method of claim 15, wherein the communication network is a Radio Access Network, RAN, wherein the first node is a cooperating base station for the wireless device, wherein the second node is a serving base station for the wireless device, and wherein processing the UL transmission comprises processing the UL transmission from the wireless device using Coordinated Multipoint (CoMP) reception.

23. The method of claim 15, wherein processing the UL transmission comprises successfully decoding the UL transmission to generate decoded information bits for the UL transmission, and wherein transmitting information comprises transmitting the decoded information bits responsive to successfully decoding the UL transmission.

24. The method of claim 15, wherein processing the UL transmission comprises failure decoding the UL transmission, and wherein transmitting information relating to the UL transmission comprises transmitting at least one of IQ data used for baseband processing, soft information bits used for decoding, and coded information bits used for decoding, responsive to failure decoding.

25. The method of claim 15, wherein the UL transmission from the wireless device is a first UL transmission from the wireless device, wherein the time slot of the first UL transmission from the wireless device is a first time slot of the plurality of time slots of the scheduling information, wherein processing the first UL transmission comprises attempting to decode the first UL transmission, and wherein transmitting the information comprises transmitting the information relating to the first UL transmission responsive to successfully decoding the first UL transmission, the method further comprising:

after receiving the scheduling information at the first node from the second node, receiving a second UL transmission from the wireless device at the first node over a second one of the plurality of time slots defined by the scheduling information;
processing the second UL transmission from the wireless device at the first node, wherein processing includes attempting to decode the second UL transmission; and
responsive to failure decoding the second UL transmission, blocking transmission of information relating to the second UL transmission.

26. A first node providing communication with a wireless device in a communications network including the first node and a second node, the first node comprising:

a network interface configured to provide communications with other nodes of the communications network;
a transceiver configured to provide wireless communications with wireless devices in a cell of the first node; and
a processor coupled with the network interface and the transceiver, wherein the processor is configured to perform operations comprising:
transmitting scheduling information for the wireless device through the network interface to a second node wherein the scheduling information defines a plurality of time slots for UpLink (UL) transmission from the wireless device to the communications network, wherein the scheduling information includes a first hypothesis for a first data rate associated with the plurality of time slots for UL transmission and a second hypothesis for a second data rate associated with the plurality of time slots for UL transmission different than the first data rate;
transmitting a UL signaling grant through the transceiver to the wireless device for one of the plurality of time slots defined by the scheduling information after transmitting the scheduling information to the second node;
receiving a UL transmission from the wireless device through the transceiver over the time slot of the UL signaling grant, wherein the UL signaling grant is a first UL signaling grant, wherein the time slot of the first UL signaling grant is a first time slot of the plurality of time slots, wherein the UL transmission is a first UL transmission, wherein the first UL signaling grant is a grant for the first data rate of the first hypothesis, wherein transmitting the first UL signaling grant comprises transmitting the first uplink signaling grant after transmitting the scheduling information including the first hypothesis and the second hypothesis to the second node, and wherein receiving the first UL transmission comprises receiving the first UL transmission at the first data rate of the first hypothesis;
receiving information from the second node through the network interface wherein the information relates to the UL transmission from the wireless device over the time slot of the UL signaling grant;
processing the UL transmission from the wireless device using the information from the second node relating to the UL transmission from the wireless device;
after transmitting the scheduling information including the first hypothesis and the second hypothesis to the second node and after transmitting the first UL signaling grant, transmitting a second UL signaling grant to the wireless device for a second one of the plurality of time slots defined by the scheduling information, wherein the second UL signaling grant is for the second data rate of the second hypothesis;

receiving a second UL transmission from the wireless device at the first node over the second time slot of the second UL signaling grant at the second data rate of the second hypothesis;

receiving information from the second node relating to the second UL transmission from the wireless device over the second time slot of the UL signaling grant; and processing the second UL transmission from the wireless device at the first node using the information from the second node relating to the second UL transmission from the wireless device.

27. A first node in a communications network including the first node and a second node providing communication with a wireless device, the first node comprising:
- a network interface configured to provide communications with the second node of the communications network;
- a transceiver configured to provide wireless communications with wireless devices in a cell of the first node; and
- a processor coupled with the network interface and the transceiver, wherein the processor is configured to perform operations comprising:
  - receiving scheduling information for the wireless device through the network interface from the second node wherein the scheduling information defines a plurality of time slots for UpLink (UL) transmission from the wireless device to the communications network,
  - receiving a UL transmission from the wireless device through the transceiver over one of the plurality of time slots defined by the scheduling information after receiving the scheduling information from the second node,
  - processing the UL transmission from the wireless device; and
  - transmitting information relating to the UL transmission from the wireless device over the time slot of the UL signaling grant, wherein the information is transmitted through the transceiver to the second node, wherein the time slot of the first UL transmission from the wireless device is a first time slot of the plurality of time slots of the scheduling information, wherein the scheduling information includes a first hypothesis for a first data rate associated with the plurality of time slots and a second hypothesis for a second data rate associated with the plurality of time slots different than the first data rate, and wherein receiving the first UL transmission comprises receiving the first UL transmission at the first data rate of the first hypothesis after receiving the scheduling information including the first hypothesis and the second hypothesis;
  - after receiving the scheduling information including the first hypothesis and the second hypothesis at the first node from the second node and after receiving the first UL transmission, receiving a second UL transmission from the wireless device at the first node over a second one of the plurality of time slots defined by the scheduling information, wherein the second UL transmission is received at the second data rate of the second hypothesis;
  - processing the second UL transmission from the wireless device at the first node; and
  - transmitting information relating to the second UL transmission from the wireless device over the second time slot, wherein the information is transmitted from the first node to the second node.

* * * * *